(12) United States Patent
Kido et al.

(10) Patent No.: US 8,250,361 B2
(45) Date of Patent: Aug. 21, 2012

(54) SERVER CERTIFICATE ISSUING SYSTEM AND PERSON AUTHENTICATION METHOD

(75) Inventors: Keisuke Kido, Tokyo (JP); Ichiro Chujo, Tokyo (JP)

(73) Assignee: GlobalSign K.K., Tokyo (JP)

( * ) Notice: Subject to any disclaimer, the term of this patent is extended or adjusted under 35 U.S.C. 154(b) by 294 days.

(21) Appl. No.: 12/810,653

(22) PCT Filed: Apr. 3, 2009

(86) PCT No.: PCT/JP2009/001571
§ 371 (c)(1),
(2), (4) Date: Jun. 25, 2010

(87) PCT Pub. No.: WO2010/023779
PCT Pub. Date: Mar. 4, 2010

(65) Prior Publication Data
US 2010/0275012 A1    Oct. 28, 2010

(30) Foreign Application Priority Data

Aug. 27, 2008   (JP) .................................. 2008-217732

(51) Int. Cl.
*H04L 9/32*   (2006.01)
(52) U.S. Cl. ........................................ 713/156; 713/157
(58) Field of Classification Search .................. 713/157
See application file for complete search history.

(56) References Cited

U.S. PATENT DOCUMENTS

| | | | |
|---|---|---|---|
| 6,763,459 B1 * | 7/2004 | Corella | 713/156 |
| 7,024,691 B1 * | 4/2006 | Herzberg et al. | 726/5 |
| 7,673,331 B2 * | 3/2010 | Kido et al. | 726/7 |
| 2008/0022104 A1 | 1/2008 | Deishi | |
| 2010/0017848 A1 * | 1/2010 | Pomerantz | 726/2 |

FOREIGN PATENT DOCUMENTS

| | | |
|---|---|---|
| JP | 2005-506737 T | 3/2005 |
| JP | 2008-054290 A | 3/2008 |
| JP | 4128610 B1 | 7/2008 |

\* cited by examiner

*Primary Examiner* — Matthew Smithers
(74) *Attorney, Agent, or Firm* — Carrier Blackman & Associates, P.C.; Joseph P. Carrier; William D. Blackman

(57) ABSTRACT

A server certificate issuing system in which existence of a Web server for which a certificate is to be issued can be confirmed and security is further improved is realized, wherein the user authentication is carried out using a test certificate having the SSL certificate format. Servers transmit server certificate request to the registration server which transmits the test certificate request to the test certificate issuing authority. The test certificate issuing server transmits the generated test certificate to the registration server which transmits the test certificate to the corresponding server and requests to install the test certificate. Then, the registration server accesses with SSL protocol to the server and verifies whether or not the session of the SSL protocol has been established. The registration server transmits the CSR to the certificate issuing server only when the SSL protocol has been established.

31 Claims, 16 Drawing Sheets

SERVER CERTIFICATE ISSUING SYSTEM AND PERSON AUTHENTICATION METHOD

TECHNICAL FIELD

The present invention relates to a server certificate issuing system in which a series of operations from application for issuance of a server certification to download of issued server certificate are automatically performed.

The present invention also relates to an authentication method worked in the server certificate issuing system.

BACKGROUND ART

In order to securely perform Internet communications between a Web server and a Web browser, SSL (Secure Socket Layer) using PKI (Public Key Infrastructure) has been put to practical use. In a communication system in which the SSL has been introduced, since an encryption process is performed by using a server certificate (SSL certificate) issued by a certificate authority (CA) which is a trusted third-party authority, spoofing, tamper, sniffing and the like are prevented and more secure Internet communications are assured.

When the certificate authority issues the server certificate, authentication of a person requesting the issuance of the server certificate is important. As a authentication method, a server certificate issuing system using domain authentication has been put to practical use (for example, see Patent Document 1). In this known authentication method, when the issuance of a server certificate is requested, a registration server accesses a database of a domain registration authority (Whois information) to contact an approver having an authority to approve the issuance of the server certificate for the above described Web server. Using communicating means such as telephone, e-mails or the like, whether or not the certificate request is approved is verified, and only if the approval from the approver is obtained, the certificate is issued.

PRIOR ART DOCUMENT

Patent Document

Patent Document 1: Japanese Patent Laid-Open No. 2005-506737

DISCLOSURE OF THE INVENTION

Problem to be Solved by the Invention

In the conventional authentication method using the domain authentication, a person having the authority to approve the issuance of the certificate is searched based on the Whois information, and the user authentication is performed based on the approval from the searched approver. However, in the authentication method of the Approver-Email system, merely the approval from the person having the authority to approve is obtained and existence of the Web server for which the certificate is to be issued is not confirmed, which has caused a security problem. Moreover, the authentication with the e-mail has a potential risk of causing a security problem in the case where the e-mail has been sniffed or the like. Furthermore, since a registration authority has to access the database of the domain registration authority to search the approver, there has been also a disadvantage of a complicated authentication task in the registration authority. In addition, confirmation of the approval has to be obtained with the communicating means such as the telephone, which has become a major impediment to automation of the issuance of the certificate.

It is an object of the invention to realize a server certificate issuing system in which the existence of various servers for which a certificate is to be issued can be verified and security is further improved.

It is another object of the invention to realize a server certificate issuing system in which a series of operations from application for the issuance of the server certification to download of the issued server certificate are automatically performed.

It is another object of the invention to provide authentication method used in the above server certificate issuing system.

Means for Solving the Problem

A server certificate issuing system according to the invention is a server certificate issuing system comprising a registration server controlled by a registration authority to receive a server certificate request transmitted from a Web server, communication server or load balancer via a network and to transmit a certificate signing request file to a certificate issuing authority, a certificate issuing server controlled by the certificate issuing authority to receive the certificate signing request file transmitted from the registration server via a network, to generate a server certificate with a digital signature, and to transmit the generated server certificate to said registration server, and a test certificate issuing server controlled by a test certificate issuing authority for issuing a test certificate used for testing to receive a test certificate issuing request transmitted from the registration server via a network and to issue a certificate for testing, wherein said Web server, communication server or load balancer comprises means for generating the server certificate request containing the address information of the server or the load balancer, means for transmitting the generated server certificate request to the registration server via network, and means for installing the test certificate generated by the test certificate issuing server and transferred from the registration server for authentication, and said registration server comprises means for receiving the server certificate request transmitted from said Web server, communication server or load balancer, means for transmitting the test certificate issuance request to the test certificate issuing server followed by receiving the certificate request, means for receiving the test certificate generated by the test certificate issuing server and for transferring the received test certificate to the Web server, communication server or load balancer corresponding to the certificate request, means for accessing with SSL protocol to the Web server, communication server or load balancer identified by an address contained in the server certificate request and for verifying the test certificate installed in said server or load balancer, and means for transmitting the certificate signing request file to the certificate issuing server via network, and said test certificate issuing server comprises means for generating a test certificate having public key certificate format followed by receiving the test certificate request from the registration server, and means for transmitting the generated test certificate to the registration server, and wherein, said registration server decides that said server certificate request is valid when the session of the SSL protocol has been established and when the certificate information included in the transmitted test certificate is identical to the certificate information included in the installed test certificate, when the registration server accessed to the Web server, communication server or load balancer identified by the address contained in the server certificate request.

According to the invention, the user authentication is performed by use of the test certificate issued by the test certificate issuing authority and having the SSL certificate format. That is, when the server certificate request is transmitted from the Web server, communication server or load balancer to the registration server, the registration server transmits the test certificate request to the test certificate issuing server. The test certificate issuing server generates the test certificate having the SSL certificate format using the public key and the common name or the CSR included in the server certificate request. The generated test certificate is transmitted from the test certificate issuing server to the registration authority, and the registration server transmits the received test certificate to a server which is identified by an address contained in the server certificate request, and then the server is requested to install the received test certificate. Then, the registration server accesses with SSL protocol to the server identified by the address information included in the server certificate request and verifies whether or not the session of SSL protocol has been established between the registration server and the corresponding server. Namely, in order to install the test certificate, the corresponding private key is essential in addition to the test certificate. If the corresponding private key dose not exist in the server, the SSL protocol is not established between the registration server and the corresponding server. Therefore, when the registration server accesses to the server, the session of SSL protocol has been established between the registration server and the corresponding server, which testifies that the private key corresponding to such test certificate exists in the server identified by the server certificate request. By such verification, the existence of the server for which a certificate is to be issued can be confirmed. Moreover, it can be also confirmed whether or not the applicant of the server certificate has the administrative authority. As the result of this, the user authentication with higher security than the conventional domain authentication is performed. Especially, since the installed test certificate has the SSL certificate format, it can be achieved that the verifying operations are performed in higher security environment. Furthermore, in addition to the confirmation of the SSL session establishment, the verification operation is performed by comparing the certificate information included in the installed test certificate with those included in the transmitted test certificate, and thus all of the operations are performed by processing the electronic dada. As the result of this, a series of the operations of the user authentication are automatically executed by the computer system controlled by the registration authority.

An another server certificate issuing system according to the invention is a server certificate issuing system comprising a registration server controlled by a registration authority to receive a server certificate request transmitted from a Web server, communication server or load balancer via a network and to transmit a certificate signing request file to a certificate issuing authority, and a certificate issuing server controlled by the issuing authority to receive the certificate signing request file transmitted from the registration server via network, to generate a server certificate with a digital signature, and to transmit the generated server certificate to said registration server, wherein said Web server, communication server or load balancer comprises means for generating the server certificate request containing the address information of the server or the load balancer, means for transmitting the generated server certificate request to the registration server via network, and means for installing a test certificate transferred from the registration server for authentication, and wherein said registration server comprises means for receiving the server certificate request transmitted from said Web server, communication server or load balancer, means for generating the test certificate having public key certificate format followed by receiving the server certificate request, means for transmitting the generated test certificate to the corresponding Web server, communication server or load balancer, means for accessing with SSL protocol to the Web server, communication server or load balancer identified by the address contained in the server certificate request and for verifying the test certificate installed in said server or load balancer, and means for transmitting a certificate signing request file to the certificate issuing server, and wherein said registration server decides that said server certificate request is valid when the session of the SSL protocol has been established and when the certificate information included in the transmitted test certificate is identical to those included in the installed test certificate, when the registration server accessed to the Web server, communication server or load balancer identified by the address contained in the server certificate request.

The registration server is authorized to issue a test certificate in order to test whether or not a public key certificate can be installed in a Web server or the like. Therefore, according to the invention, the registration server generates a test certificate when the server certificate request is transmitted from the Web server to the registration server. The generated test certificate is transmitted to the Web server together with the private key, and the Web server is requested to install the test certificate. After completion of the installation of the test certificate, the registration server accesses the Web server and verifies whether or not the SSL session is established.

In this embodiment, the registration server can generate the test certificate using the key pair generated by the registration server, even if the server certificate request including the CSR is transmitted from the Web server to the registration server.

An authentication method according to the invention is an authentication method worked in a server certificate issuing system, which system comprises a registration server controlled by a registration authority to receive a server certificate request transmitted from a Web server, communication server or load balancer via a network and to transmit a certificate signing request file to a certificate issuing authority, a certificate issuing server controlled by the issuing authority to receive the certificate signing request file transmitted from the registration server, to generate a server certificate with a digital signature and to transmit the generated server certificate to the registration server, and a test certificate issuing server controlled by a test certificate issuing authority which issues a test certificate for testing to receive a test certificate issuing request and to issue the test certificate, said authentication method comprising the steps of:

a step in which the registration server generates the test certificate issuance request and transmits the generated test certificate issuance request to the test certificate issuing server, followed by receiving the server certificate request transmitted from the Web server, communication server or the load balancer via a network;

a step in which the test certificate issuing server generates the test certificate having a public key certificate format and transmits the generated test certificate to said registration server, followed by receiving the test certificate request;

a step in which the registration server transmits the received test certificate to the corresponding Web server, communication server or load balancer;

a step in which the Web server, communication server or load balancer which has received the test certificate installs the received test certificate;

a step in which the registration server accesses with SSL protocol to a Web server, communication server or load balancer identified by an address contained in the received server certificate request and verifies whether or not a session of SSL protocol is established, and wherein said registration server decides that said server certificate request is valid when the session of the SSL protocol has been established and when the certificate information included in the transmitted test certificate is identical to those included in the installed test certificate, when accessing the Web server, communication server or load balancer identified by the address contained in the server certificate request.

An another authentication method according to the invention is an authentication method worked in a server certificate issuing system, which system comprises a registration server controlled by a registration authority to receive a server certificate request transmitted from a Web server, communication server or load balancer via a network and to transmit a certificate signing request file to a certificate issuing authority, a certificate issuing server controlled by the issuing authority to receive the certificate signing request file transmitted from the registration server, to generate a server certificate with a digital signature and to transmit the generated server certificate to the registration server, said authentication method comprising the steps of;

a step in which the registration server generates a test certificate having a public key certificate format and transmits the generated test certificate to the corresponding Web server, communication server or the load balancer, followed by receiving the server certificate request transmitted from the Web server, communication server or the load balancer;

a step in which the Web server, communication server or the load balancer which has received the test certificate installs the received test certificate;

a step in which the registration server accesses with SSL protocol to the Web server, communication server or load balancer identified by an address contained in the received server certificate request and verifies whether or not a session of SSL protocol is established, wherein said registration server decides that said server certificate request is valid when the session of the SSL protocol has been established and when the certificate information included in the transmitted test certificate is identical to those included in the installed test certificate, when accessing to the Web server, communication server or load balancer identified by the address contained in the server certificate request.

Effect of the Invention

According to the invention, since the user authentication is performed using the test certificate having the SSL certificate format, the operations of the user authentication is carried out in the environment with high security in which the SSL protocol is established. As the result of this, the server certificate is issued in the environment with higher security than the prior domain certification. Moreover, the processes of the user authentication are performed by comparing the electronic data with each other, the processes from application for issuance of the certificate to installation of the issued server certificate are automatically carried out by use of the computer system and the communication means.

BEST MODE FOR CARRYING OUT THE INVENTION

Figure 1:
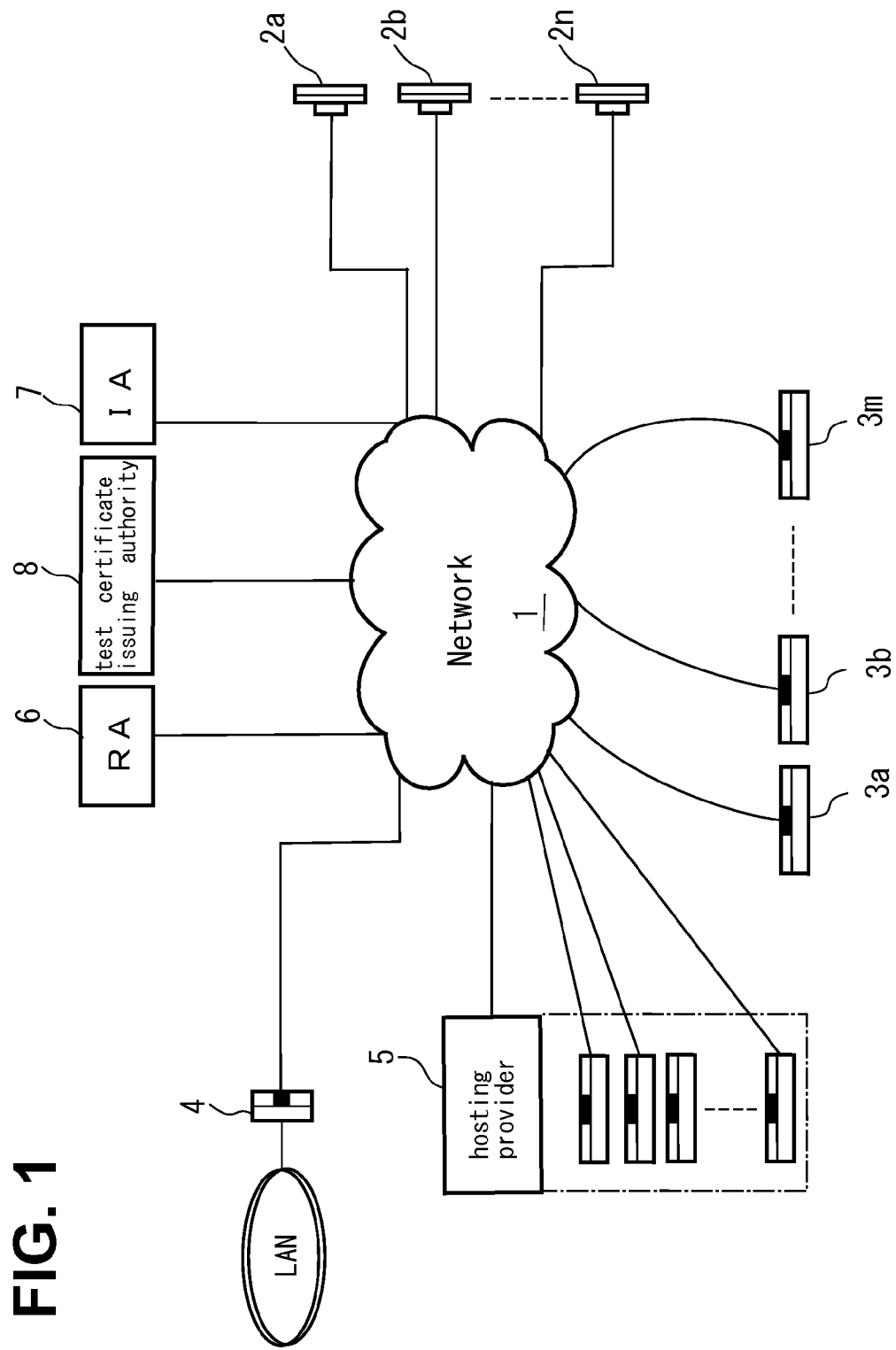
FIG. 1 A diagram showing an overall configuration of a server certificate issuing system according to the invention.

FIG. 1 is a diagram showing an overall configuration of a server certificate issuing system according to the invention. To a network 1, user terminals 2a~2n and Web servers 3a~3m are connected. In addition, a communication server 4 which functions as a communication device and a load balancer (not shown) are also connected to the network 1. Further, Web servers whose management are entrusted to a hosting provider are connected to the network 1. Each user can access the Web server, communication server or the load balancer which is owned or administrated by him/her via the network and set the servers or the load balancer to be operable. Furthermore, a registration server 6 controlled by a registration authority which accepts a server certificate request and a certificate issuing server controlled by the certificate issuing authority which receives the CSR transmitted from the registration server and issues the server certificate are connected to the network 1. Furthermore, to the network 1, the test certificate issuing server 8 is connected, which is controlled by the test certificate issuing authority which issues the test certificate used for testing. Such test certificate is used to conform whether or not the server certificate is installed in a specified environment, or to test performance of a business program. The test certificate is certificate data which has SSL certificate format and is issued by the test certificate issuing authority. Such test certificate is generated by signing against the certificate signing request file transmitted from the various servers using the private key of the test certificate issuing authority. The registration authority or the certificate issuing authority often holds the test certificate issuing authority. In such case, the test certificate is issued by the registration authority or the certificate issuing authority.

When each user wishes an issuance of the server certificate for the Web server which is owned or administrated by him/her, the user can access the Web server via the terminal and the network to generate the server certificate request and to transmit it to the registration server 6 via the network. And also, as to the communication server 4 and the load balancer, the server certificate can be issued as well as the Web server. In this case, the administrator of the communication server or the load balancer can access the communication server or the load balancer through the terminal and the network to generate the server certificate request and to transmit it to the registration server 6. Furthermore, in the case that the Web server is managed by the hosting provider, the user having the use authority for the Web server can access it to generate the server certificate request and to transmit it to the registration server. Alternatively, when the hosting provider is entrusted with the administration of the server, the hosting provider can be entrusted with the application of server certificate by the user. In this case, the hosting provider accesses to the corresponding Web server to generate the server certificate request, and then the generated server certificate request is transmitted from the Web server to the registration server.

When the server certificate has been generated by the certificate issuing authority, the generated server certificate is downloaded to the Web server, communication server or load balancer via the registration server. Since a series of the operations from the application for issuance of the server certificate to the downloading of the issued server certificate are the same to the various servers including the Web server and the communication server, explanation of the Web server is described by way of example.

In this embodiment, it is assumed that functions from the server certificate request to downloading of the issued certificate are executed by control panel incorporated into the Web server or the communication server. In each Web server, the control panel for mainly configuring and managing the Web and the mail is incorporated therein, and an issuance and management of an SSL certificate are performed under the control of the control panel in this example. For example, if the administrator of the Web server desires the issuance of the server certificate, the administrator accesses the Web server managed by him/her to display a menu of the control panel. Then, the administrator clicks on a menu "Issuance of SSL Certificate" in the displayed menu. When the menu "Issuance of SSL Certificate" is clicked, the control panel displays an entry screen for inputting application information for the server certificate. The application information for the issuance of the server certificate includes at least the following information.

a common name (FQDN: Fully Qualified Domain Name) or an IP address of the Web Server, a name and an e-mail address of an application administrator;
a validity start date and a validity period of the certificate; and
a class of the certificate When necessary application information has been completely inputted, the control panel generates a key pair, a Certificate Signing Request file (CSR) and a server certificate request. The server certificate request contains CSR and relational information. The CSR contains the public key, FQDN of the Web server, a country code, and information about a name and an address of a company, or the like. The relational information contains the information about the validity period and the class of the certificate. The server certificate request including the CSR and the relational information are transmitted to the registration server 6 via the network, and examination operations including the user authentication are performed in the registration server. If the certificate request satisfies predetermined requirements, the registration server 6 transmits the CSR to the certificate issuing server 7 provided in the issuing authority, and the certificate issuing server signs using the private key of the certificate issuing authority to generate the server certificate. The generated server certificate is transmitted to the registration server 6 and stored in a download area, and the registration server notifies the Web server of completion of the downloading. When receiving the download notification, the control panel of the Web server transmits a download request to the registration server and installs the downloaded server certificate therein. That is, in this example, after the certificate request is inputted by the administrator of the Web server, operations from the application for the issuance of the certificate to the installation of the server certificate are automatically executed under the control of the control panel incorporated into the Web server.

Figure 2:
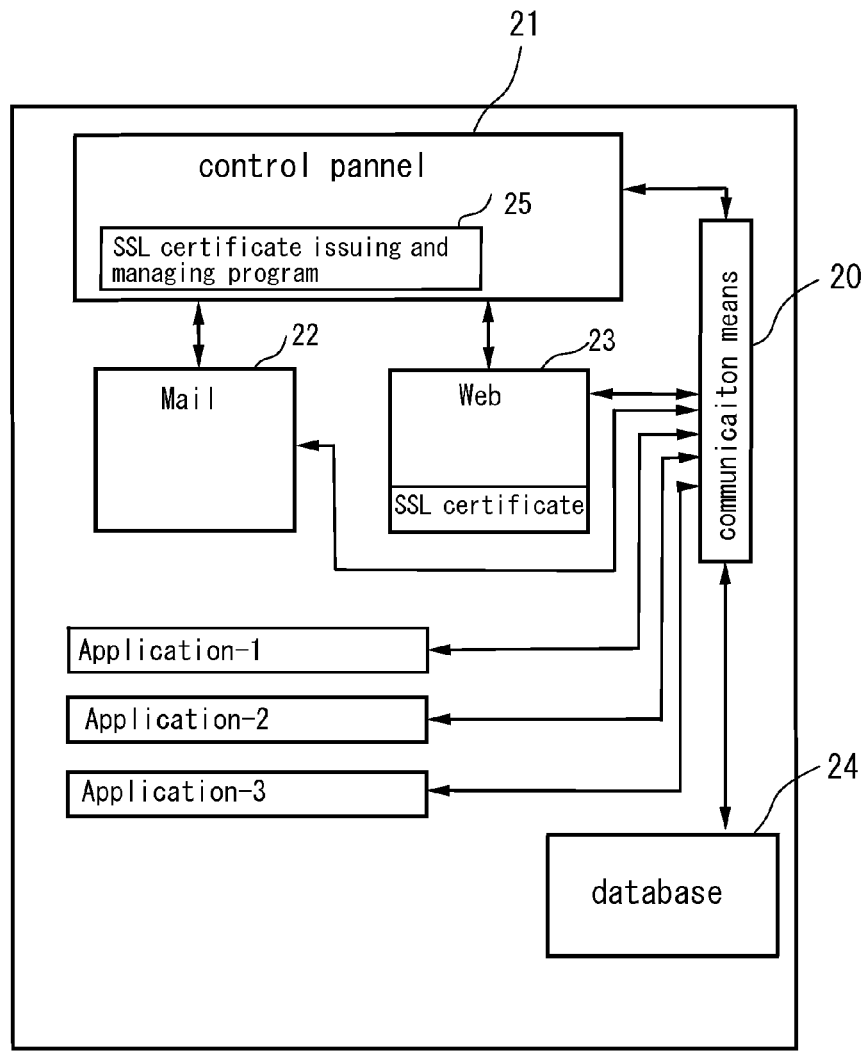
FIG. 2 A diagram showing an example of a Web server according to the present invention.

FIG. 2 is a diagram showing a configuration of an example of the Web server according to the invention. The Web server has communicating means 20, and communicates with a user terminal via the communicating means 20. Furthermore, the Web server has a control panel 21, and the mail and the Web are configured and managed by the control panel 21. Therefore, a mail function section 22 and a Web function section 23 are configured and managed by the control panel 21. The Web function section 23 is provided with an SSL certificate control function section, and the SSL certificate control function section performs the functions of the installation of the certificate and https protocol control based on the certificate, and in addition, typically, a function of generating a PKI key pair and the CSR. In the Web server, applications 1 to 3 are incorporated and also a database 24 is incorporated.

The control panel 21 is provided with an SSL certificate issuing and managing program 25, and under the control of this SSL certificate issuing and managing program 25, the processes from the application for the issuance of the server certificate to the installation of the issued server certificate are executed in series.

Figure 3:
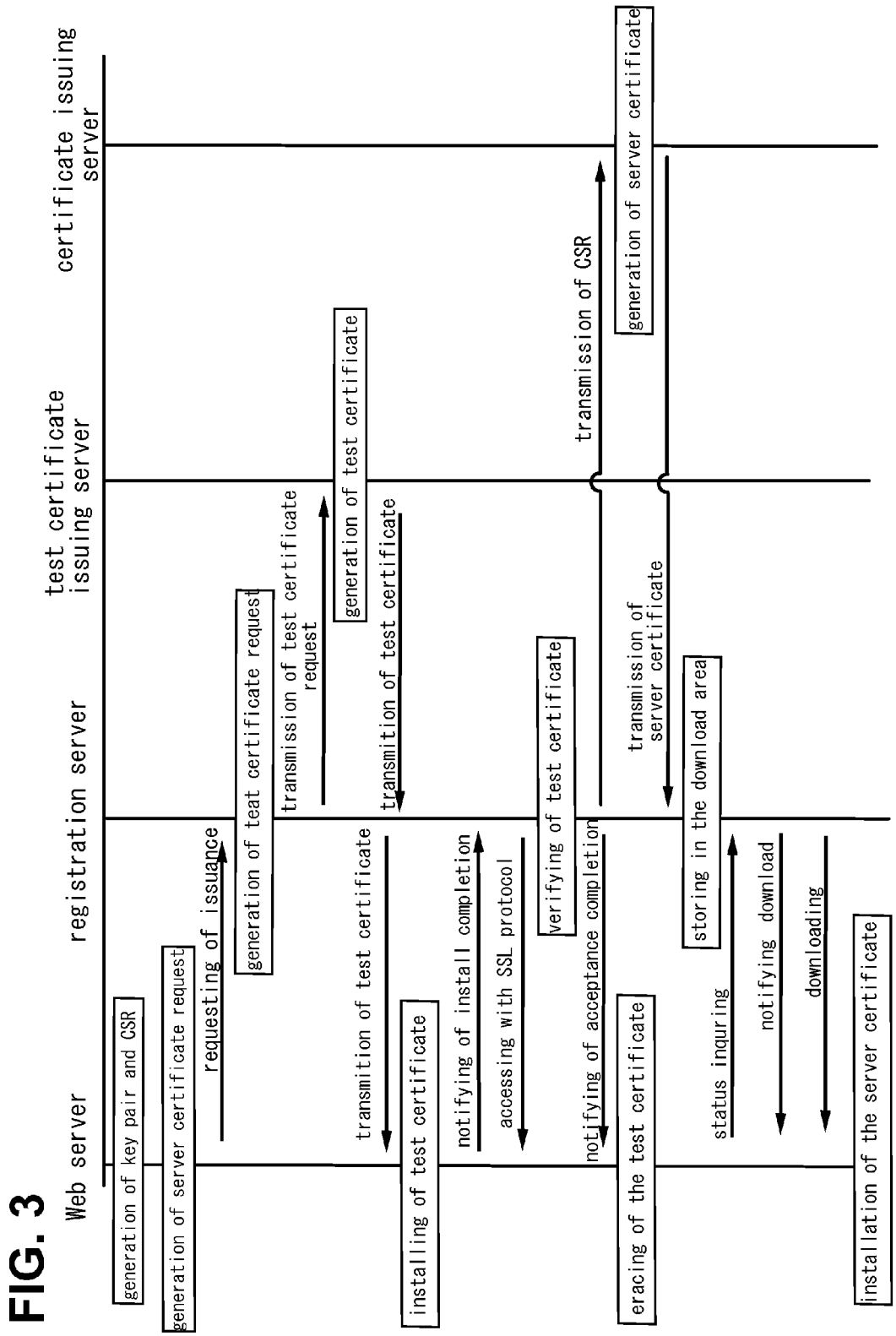
FIG. 3 A diagram showing a first embodiment of the server certificate issuing system according to the invention.

FIG. 3 shows first embodiment of the invention. FIG. 3 shows a procedure of the operations from the application for the issuance of the server certificate to the installation of the server certificate, among the Web server, the registration server, the test certificate issuing server and the certificate issuing server. In this embodiment, when the server certificate request is transmitted from the Web server to the registration server, the user authentication is carried out using the test certificate generated by the test certificate issuing server by use of the CSR. The test certificate is generated based on the X.509 standardized specification as a public key certificate, and is encrypted data having a format of the SSL certificate. This test certificate is generated by providing the CSR with digital signature using the private key of the test certificate issuing authority. When making the application for the issuance of the server certificate, the administrator of the Web server accesses the Web server managed by him/her to display the entry screen, and inputs the predetermined application matters. Under the control of the control panel, the Web server generates the key pair and the CSR and also generates the server certificate request. The server certificate request is transmitted to the registration server via the network.

Firstly, the registration server checks the format, and if there is an error in the inputted information, the registration server transmits the error. Next, the registration server generates the test certificate issuance request and transmits it to the test certificate issuing server. The test certificate issuance request contains indication of requesting issuance of the test certificate, the CSR and the relational information. The test certificate issuing server rearranges the data including the CSR and the necessary relational information and provides the CSR and the necessary relational information with digital signature to generate the test certificate. Such test certificate is certificate data having SSL certificate format which is used to check whether or not the server certificate is installed in a specific environment, and is issued by the test certificate issuing authority. Since the name (DN) of the test certificate issuing authority is different from that of the certificate issuing authority for issuing a normal server certificate, the user can identify the test certificate clearly. The test certificate issued by the test certificate issuing authority is transmitted to the registration server, and also is transmitted from the registration authority to the corresponding Web server as the response to the server certificate request.

The Web server installs the received test certificate using the private key generated when the CSR was generated, and transmits the install completion notification to the registration server. The registration server transmits the error to the corresponding Web server, if the notification of installation completion is not received within the predetermined time interval after the test certificate is transmitted.

When the registration server receives the notification of install completion, it accesses with SSL protocol to a server identified by an address contained in the server certificate request. Then, it is verified whether SSL protocol is established or not. The test certificate is generated based on the X.509 specification standardized as generation specification of a public key certificate, and has the same format as the normal SSL certificate. Therefore, if the test certificate is installed using the private key, the SSL session is established between the registration server and the Web server, and then data exchange based on the SSL protocol is performed. Therefore, the verifying means of the registration server verifies whether the session of the SSL protocol has been established between the Web server, and then the error operation is performed if the session of the SSL protocol is not established. When the session of the SSL protocol is established, the data exchange is performed between the registration server and the Web server. And, the verifying means operates to confirm the identity between the address of the accessed Web server and the address contained in the CSR, and also to confirm the identity between the certificate information included in the installed test certificate and those included in the transmitted test certificate. If the SSL session is established and the identity of the address and the certificate information is confirmed, the registration server decides that this server certificate request is valid. However, if the SSL protocol is not established, the registration server decides that the user authentication is not valid, and transmits the error. And also, if the identity of the certificate information included in the test certificate is not confirmed, the registration server transmits the error.

If the registration server has decided that the user authentication is valid, the registration server transmits the order ID and the notification of acceptance completion to the Web server. Further, the registration server transmits the CSR and the relational information to the certificate issuing server.

When the Web server receives the acceptance completion notification or the error notification, it erases the installed test certificate immediately.

When the certificate issuing server receives the CSR and the relational information, it rearranges the data contained in the CSR and the relational information, and generates the server certificate with digital signature. The certificate issuing server transmits the generated server certificate to the registration server. When receiving the server certificate, the registration server stores the received server certificate in a download area.

The registration server receives the status inquiry periodically transmitted from the Web server, and confirms whether or not the server certificate is stored in the download area. If the server certificate is not stored, the registration server transmits the non-completion notification to the Web server as the response. If the server certificate is stored in the download area, the registration server transmits the download notification as the response to the status inquiry. When receiving the download notification, the Web server transmits the download request to the registration server. In response to the received download request, the registration server downloads the server certificate to the Web server. Under the control of the control panel, the Web server installs the downloaded server certificate therein.

In this way, in the server certificate issuing system according to the invention, the processes up to the installation of the issued server certificate are automatically carried out only by inputting the application information required for the issuance of the server certificate, and thereby a procedural burden on the administrator is significantly reduced.

Figure 4:
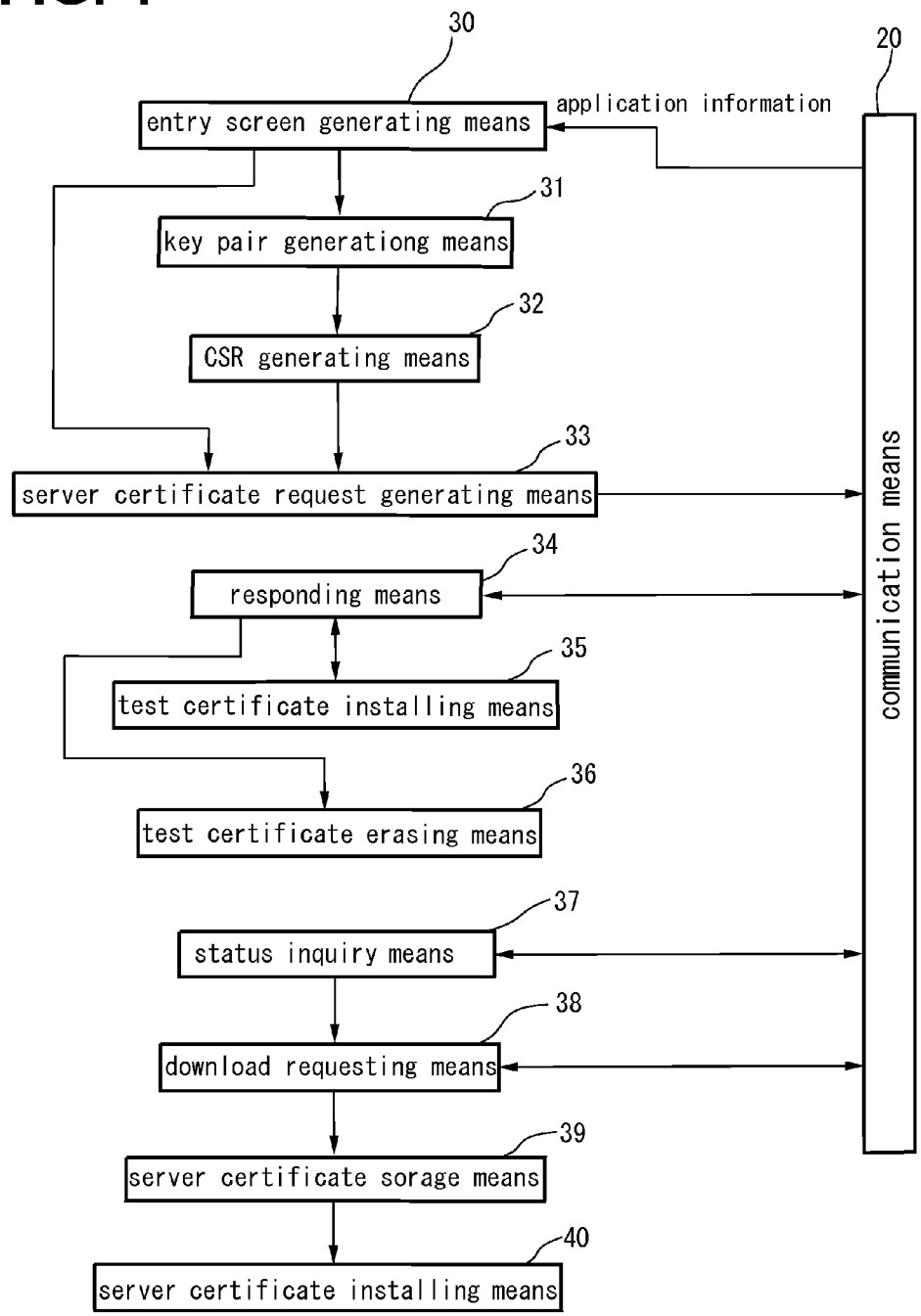
FIG. 4 A diagram showing an example of an SSL certificate issuing and managing program incorporated into the Web server.

FIG. 4 is a diagram showing the functions of the SSL certificate issuing and managing program of the control panel. When the administrator of the Web server accesses the Web server, entry screen generating means 30 is operable, and the entry screen to input the application information required for issuance of the certificate is displayed on a monitor. When the administrator of the Web server has completely inputted the application information, key pair generating means 31 is operable to generate a key pair of a public key and a private key. Next, CSR generating means 32 operates to generate the CSR containing the public key. The relational information including the validity start date and the validity term of the certificate and the class of the certificate is transmitted to the server certificate request generating means 33 along with the generated CSR. In the server certificate request generating means 33, the server certificate request is generated and is transmitted to the registration server provided in the registration authority, via the communication means 20 and the network 1.

The SSL certificate issuing and managing program comprises responding means 34 and receives the test certificate transmitted from the registration server. The received test certificate is installed by the test certificate installing means 35 in relation with the private key generated by the key pair generating means 31. When the installation of the test certificate has been completed, the completion notification of the test certificate installation is transmitted to the registration server via the responding means 34. With respect to the certificate issued by the test certificate issuing authority, it is desirable to contain such certificate in a list of root certificate trusted by the Web server.

When the user authentication operation has been completed and the notification of acceptance completion is transmitted from the registration server to the Web server, or the user authentication is decided to be invalid and the error is transmitted, the test certificate erasing means 36 operates to erase the installed test certificate.

Furthermore, the SSL certificate issuing and managing program has status inquiry means 37 for inquiring of the registration server as to an issuance status of the certificate. After the server certificate request has been transmitted, the SSL certificate issuing and managing program periodically inquires of the registration server as to the issuance status of the certificate, and also receives a response from the registration server. Furthermore, the SSL certificate issuing and managing program has server certificate download requesting means 38 to transmit the download request to the registration server when the download notification has been transmitted from the registration server. The downloaded server certificate is stored in server certificate storage means 39, and is installed by installing means 40.

Figure 5:
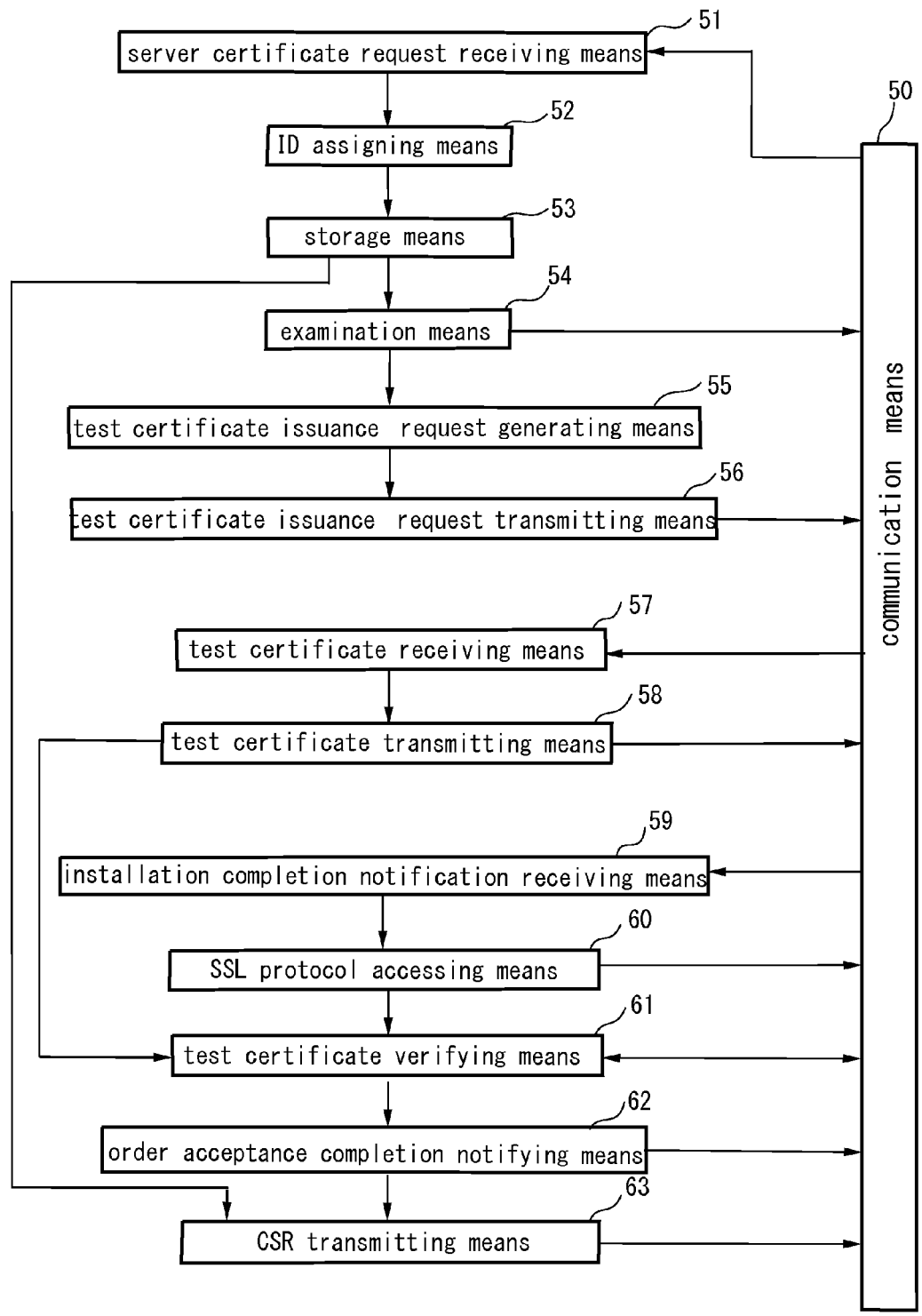
FIG. 5 A diagram showing an example of a computer system of a registration server up to the CSR transmitting function.
Figure 6:
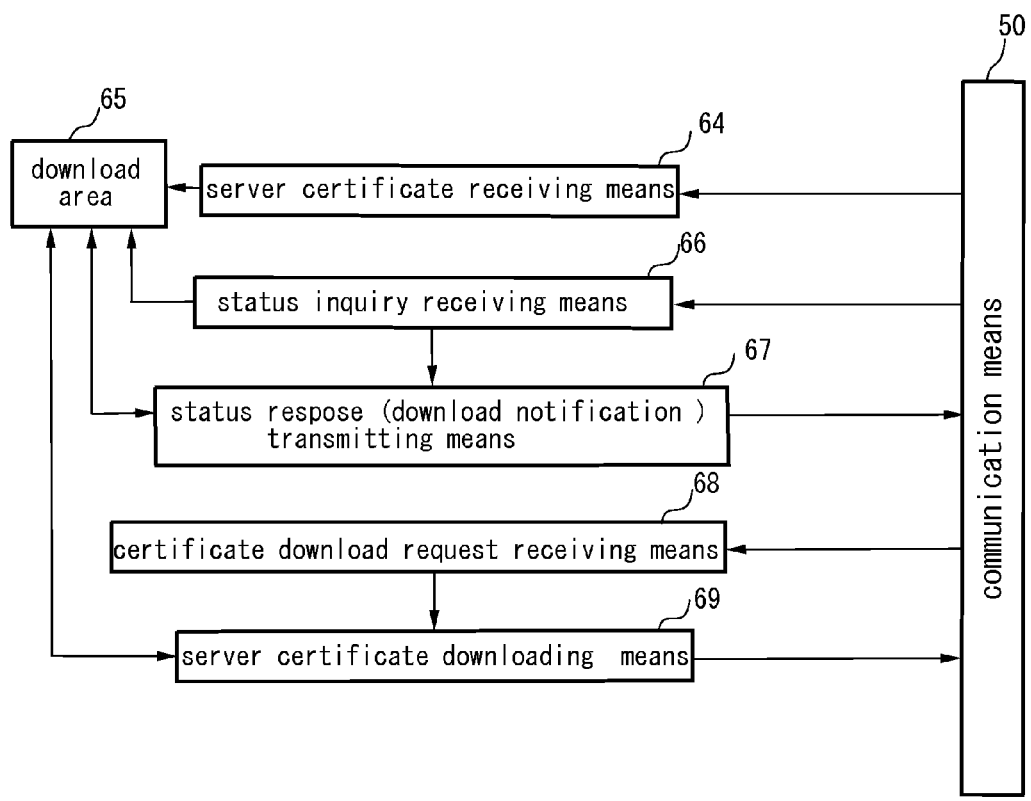
FIG. 6 A diagram showing an example of a computer system of a registration server after the CSR transmitting function.

FIGS. 5 and 6 are diagrams showing an example of a computer system of the registration server controlled by the registration authority. FIG. 5 shows the functions from the reception of the server certificate request up to the transmission of the CSR and the relational information, and FIG. 6 shows the functions after the transmission of the CSR. The certificate request transmitted from the Web server is received by means of certificate request receiving means 51 via communicating means 50. The received server certificate request is assigned an order ID by means of ID assign means 52 and is stored in storage means 53. The stored certificate request is examined by examining means 54, and format checking is performed whether or not the certificate request contains predetermined application matters. If the predetermined matters are not contained therein, such certificate request is processed to be an error.

After the checking of the format of the certificate request, test certificate issuance request generating means 55 is enable. The test certificate issuance request includes an indication of requesting for issuance of the test certificate as well as the CSR and the relational information contained in the server certificate request. The generated test certificate request is transmitted to the test certificate issuing server via test certificate issuance request transmitting means 56. The test certificate issuing server signs against the CSR and the relational information to generate the test certificate. The generated test certificate is transmitted to the registration server via the network.

The test certificate transmitted from the test certificate issuing server is received by test certificate receiving means 57. The received test certificate is transferred to the corresponding Web server by test certificate transmitting means 58, and this Web server is requested to install the test certificate. If the test certificate is not installed in a predetermined short time period after it is transferred, this server certificate request is processed to be an error.

The completion notification of test certificate installation transmitted from the Web server is received by installation completion notification receiving means 59. Then, SSL protocol accessing means 60 operates to access with SSL protocol to a server identified by the FQDN included in the server certificate request. If the test certificate is installed in relation with the private key, the SSL session is established between the registration server and the Web server, and data exchange is performed. Subsequently, the test certificate verifying means 61 operates to verify whether or not the session of SSL protocol has been established and to verify validity of the test certificate installed in the Web server. This test certificate verifying means 61 verifies whether the address of the accessed server is identical to the address contained in the CSR and also whether the certificate information included in the test certificate transmitted to the Web server is identical to those included in the test certificate which has been installed. As the result of the verification, verifying means decides that this server certificate request is valid, if it has been confirmed that the SSL session is established, and the addresses are identical to each other, and the contents of the installed test certificate are identical to those of the transmitted test certificate. As the result of the verification, if the SSL session has not been established, such server certificate request is processed to be an error.

When the server certificate request is decided to be valid, order acceptance completion notifying means 62 operates to transmit the completion of order acceptance and the acceptance ID to the Web server. And also, the CSR transmitting means 63 operates to transmit the CSR and the relational information derived from the server certificate request to the certificate issuing server.

The certificate issuing server provided in the issuing authority (IA) generates the server certificate with digital signature by use of the private key of the certificate issuing server and transmits the generated server certificate to the registration server via the network, followed by receiving the CSR and the relational information transmitted from the registration server.

Referring to FIG. 6, the server certificate transmitted from the certificate issuing server is received by means of server certificate receiving means 64 and is stored in the download area 65. The registration server comprises means 66 for receiving the certificate status inquiry transmitted from the Web server. When receiving the status inquiry from the Web server, the status inquiry receiving means 66 confirms whether or not the server certificate is stored in the download area 65 using the acceptance ID as a key. If the server certificate is not stored, non-completion is notified to the Web server via status response transmitting means 67. If the server certificate is stored, the download notification is transmitted via the status response transmitting means. The download request from the Web server is received by certificate download request receiving means 68. When the download request from the Web server is received, the server certificate is downloaded to the Web server by means of server certificate downloading means 69 via the network As shown in FIG. 4, the downloaded server certificate is stored in server certificate storage means 39 of the Web server, and is installed by means of certificate installing means 40.

It should be noted that, if the server certificate is stored in the download area at the time of receiving the status inquiry from the Web server, the server certificate can also be downloaded via the status response transmitting means 68 as a status response.

A variation of the test certificate used for the user authentication will be described. In the above described embodiment, in the test certificate issuing server, the test certificate is generated with digital signature using the private key of the test certificate issuing authority. However, it is possible that the test certificate is generated with digital signature using the nominal private key of the certificate issuing authority. In this case, the registration server produces an relational information in which the validity term is shortened within several minutes or hours, and produces the test certificate request including the generated relational information and the CSR and transmits it. The certificate issuing server signs against the received CSR and the relational information including the shortened validity time period by use of the normal private key to generate the test certificate. The generated test certificate is a normal server certificate in which the validity time interval is limited within several minutes or hours. This normal server certificate in which the validity interval is shortened is transmitted to the registration server as a test certificate, and the registration server transmits it to the corresponding Web server.

The Web server installs the test certificate transferred from the registration server, and transmits the installation completion notification to the registration server. Subsequently, the registration server accesses the corresponding Web server with SSL protocol to verify the installed test certificate. As the result of the verification, if it has been confirmed that the SSL protocol has been established, this server certificate request is decided to be valid. In this way, it is possible that the test certificate is generated using the normal private key of the certificate issuing server.

Figure 7:
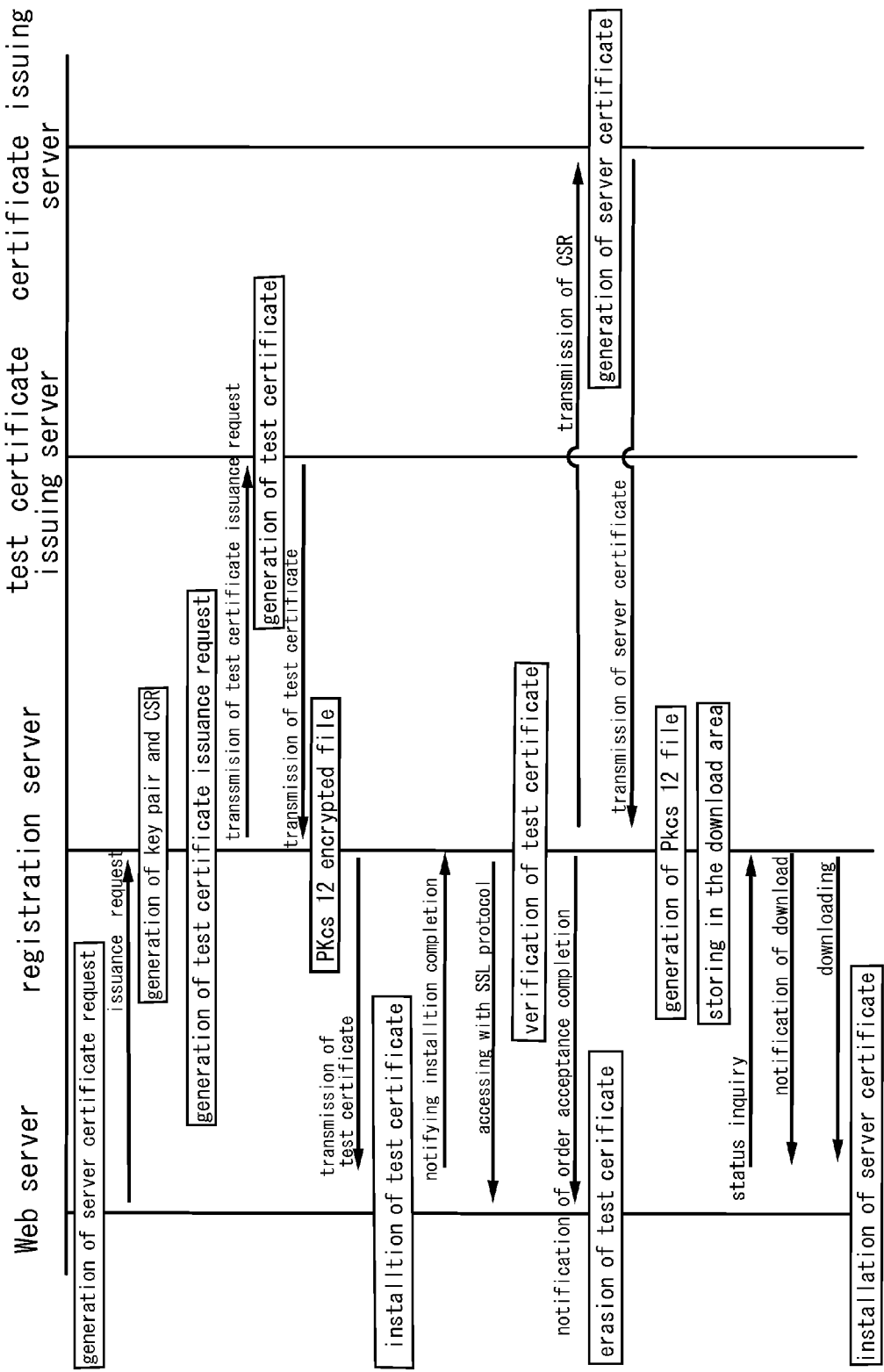
FIG. 7 A diagram showing a second embodiment of the server certificate issuing system according to the invention.
Figure 8:
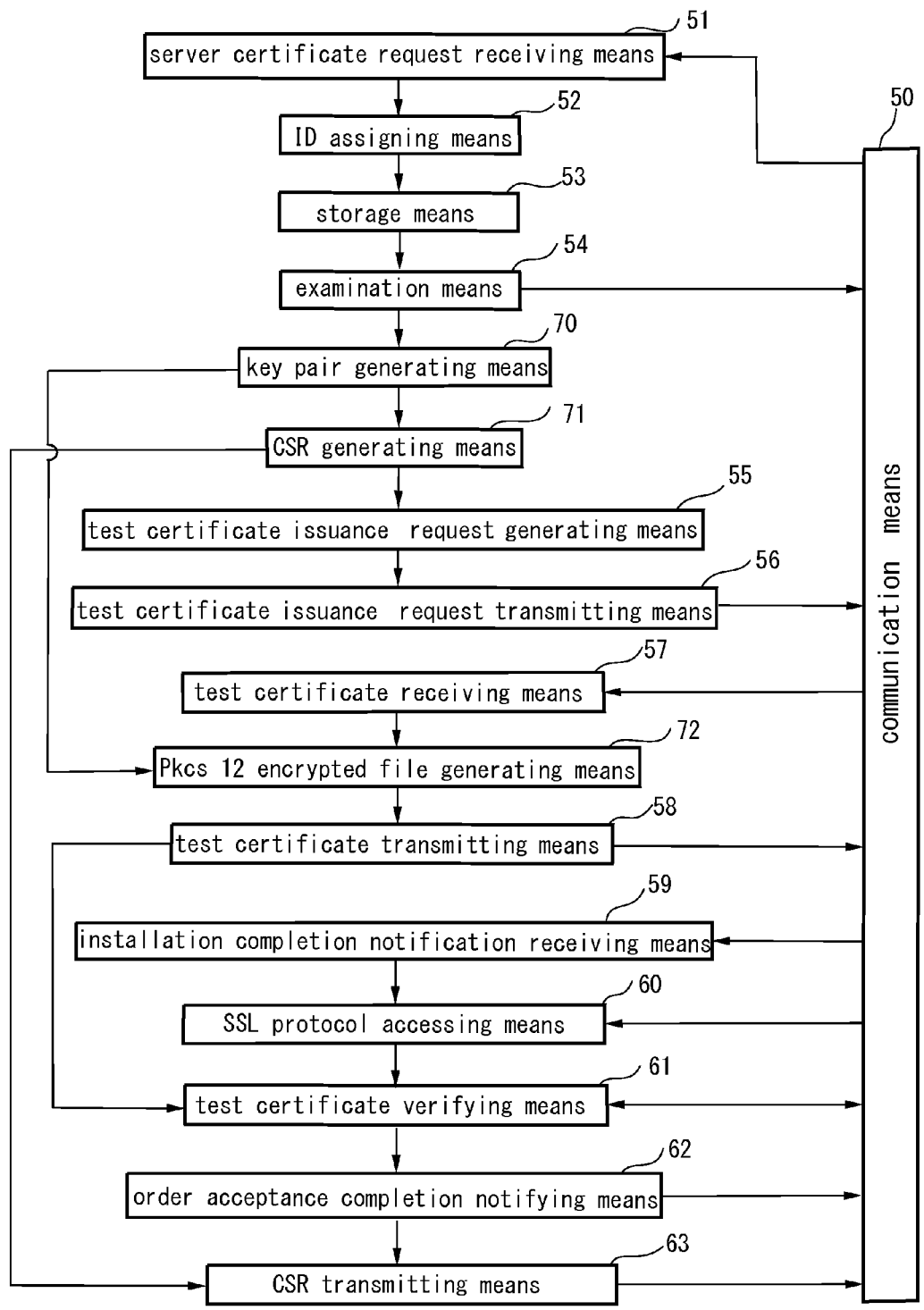
FIG. 8 A diagram showing an example of computer system of the registration server in which the test certificate is generated in the registration server.
Figure 9:
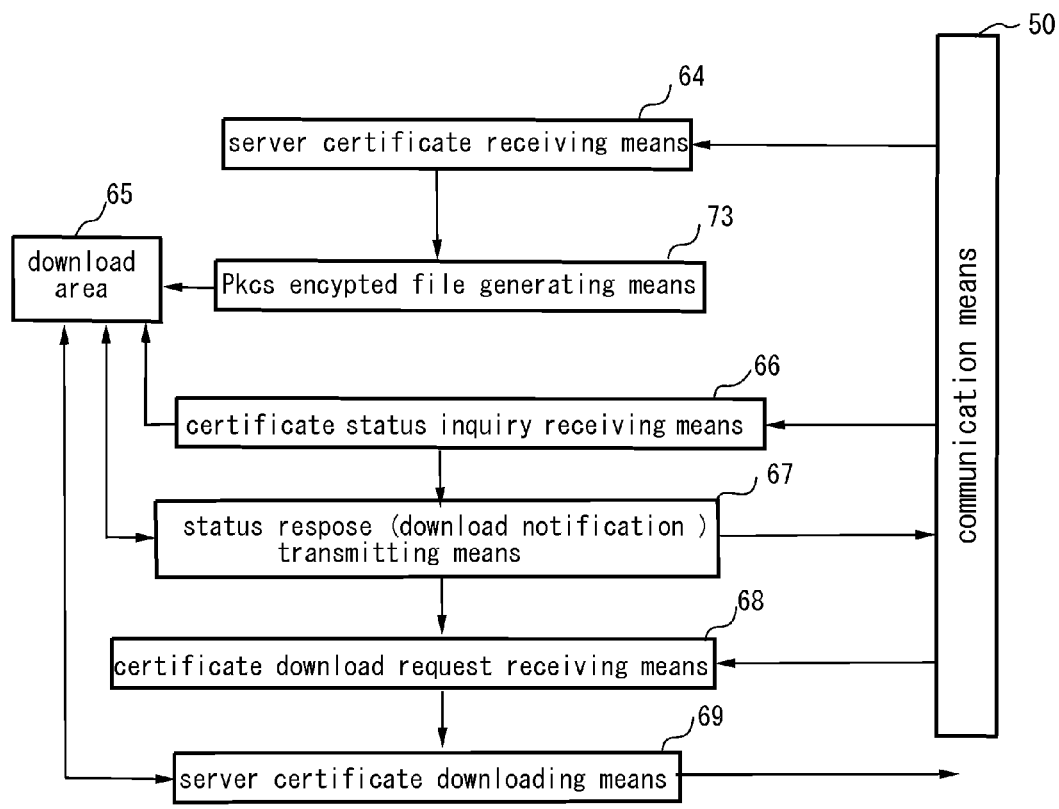
FIG. 9 A diagram showing an example of computer system of the registration server in the embodiment in which the CSR is generated in the registration server.

FIGS. 7~9 are diagrams showing the second embodiment of the server certificate issuing system according to the invention. In the above described embodiment, the key pair and the CSR were generated in the Web server. However, the server certificate issuing system according to the invention, it is possible to generate the key pair and the CSR in the registration server. FIG. 7 is a diagram showing a procedure of the processes in the server certificate issuing system in which the key pair and the CSR are generated in the registration server. FIGS. 8 and 9 are diagrams showing the computer system of the registration server. It should be noted that the same reference numerals are assigned to the same components as those used in FIGS. 5 and 6 in the following description. Referring to FIG. 7, in the Web server, the application information is inputted, and the server certificate request is generated. The application information includes FQDN of the Web server, Dn (organization, organization unit, country code or the like), the validity period of the certificate, the class of the certificate, mail address for communication, and a password having the type of Pkcs12. The password for Pkcs12 is used to decrypt the encrypted test certificate and the encrypted private key transmitted from the registration server. It should be noted that a program of Pkcs12 used to decrypt the encrypted data is generally incorporated into the Web server and thus the user can decrypt the encrypted file using such Pkcs12 program standardized in the Web server.

The registration server generates the key pair by means of key pair generating means 70 and generates the CSR by means of CSR generating means 71 followed by receiving the server certificate request. Subsequently, the test certificate issuance request including the CSR is generated by the test certificate issuance request generating means 55 and is transmitted to the test certificate issuing server. The test certificate issuing server derives the CSR and provides the CSR with digital signature using the private key of the test certificate issuing authority to generate the test certificate. The generated test certificate is transmitted to the registration server.

The registration server encrypts the test certificate and the private key which was generated at the time of generating the key pair using the password of Pkcs12 to produce an encrypted Pkcs12 file by means of Pkcs12 file generating means 72. This encrypted file is transmitted to the corresponding Web server by means of test certificate transmitting means 58.

The Web server decrypts the received encrypted Pkcs12 file using the password and derives the test certificate and the corresponding private key. Subsequently, the Web server installs the received test certificate using the private key. After installing the test certificate, the Web server transmits the install completion notification to the registration server. When the SSL session has been established between the registration server and the Web server, since high security environment is established, the registration server can transmits the test certificate and the private key to the Web server without encrypting operation.

The registration server accesses the Web server with SSL protocol and verifies the installed test certificate. In the verifying process, it is verified whether or not the session of SSL protocol has been established and judged the validity of the test certificate installed in the Web server. As the result of the verification, it is decides that this server certificate request is valid, if it has been confirmed that the SSL session is established and the contents of the installed test certificate are identical to those of the transmitted test certificate. Subsequently, order acceptance completion notifying means 62 operates to transmit the completion of order acceptance and the acceptance ID to the Web server. And also, the CSR transmitting means 63 operates to transmit the CSR and the relational information derived from the server certificate request to the certificate issuing server.

The certificate issuing server generates the server certificate with digital signature by use of the private key of the certificate issuing authority and transmits the generated server certificate to the registration server via the network, followed by receiving the CSR and the relational information transmitted from the registration server.

The registration server encrypts the received server certificate and the private key to produce the encrypted Pkcs12 file. The generated and encrypted file is stored in the download are 65. And then, the encrypted file is installed in the corresponding Web server according to the procedure described in the first embodiment.

Figure 10:
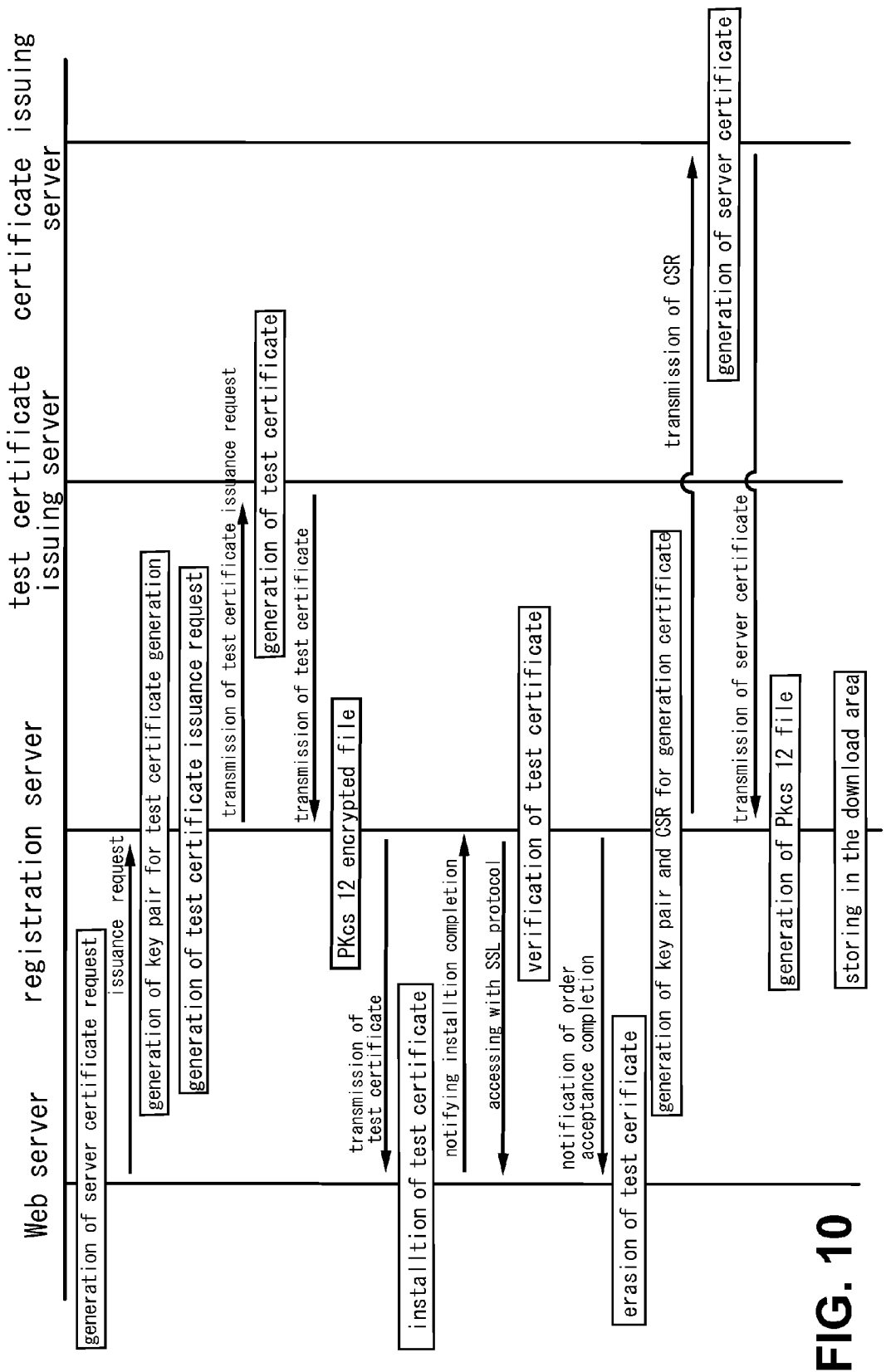
FIG. 10 A diagram showing a third embodiment of the server certificate issuing system according to the invention.
Figure 11:
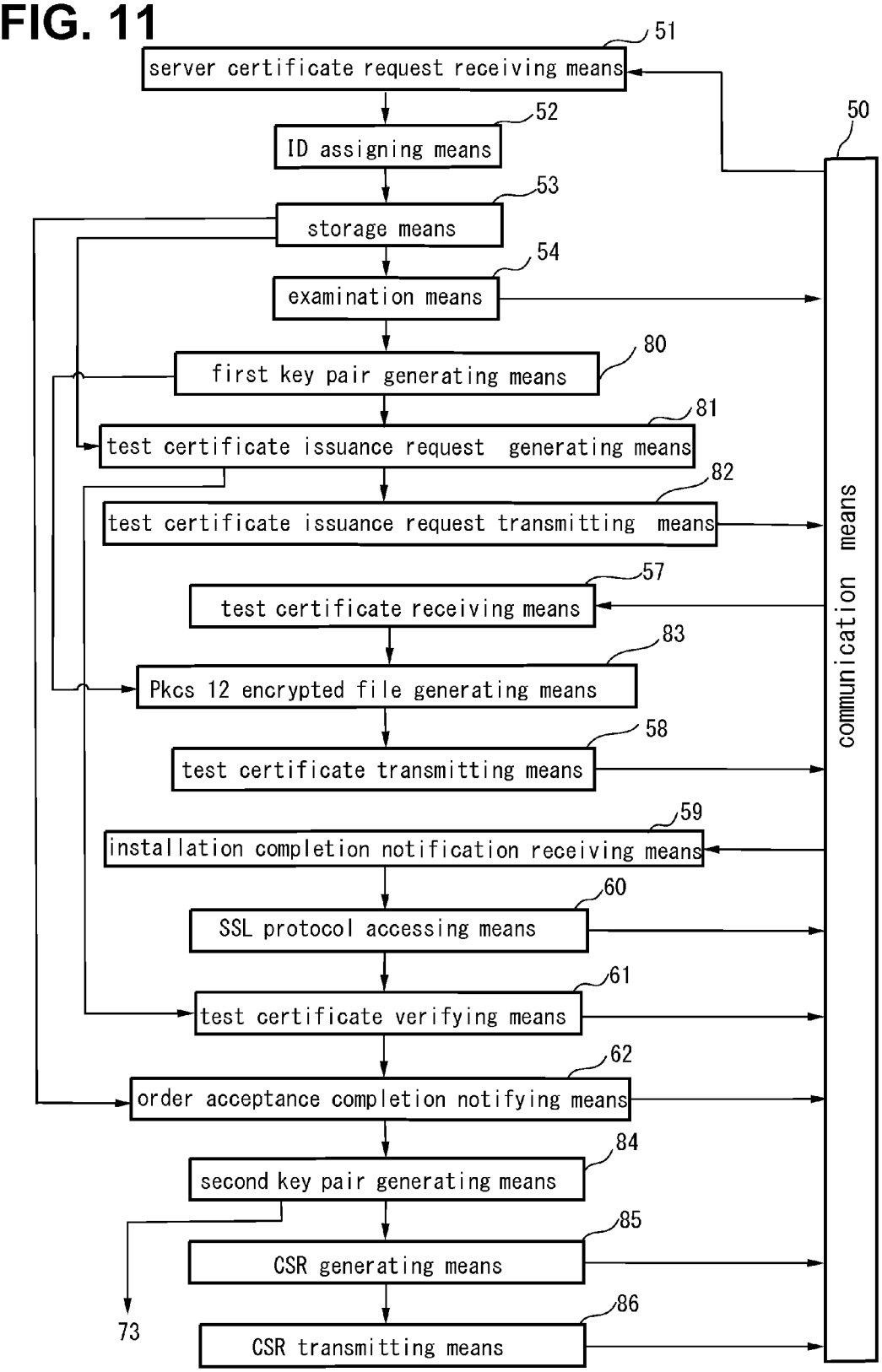
FIG. 11 A diagram showing a computer system of the registration server in the third embodiment.

FIGS. 10 and 11 show the third embodiment of the server certificate issuing system according to the invention. FIG. 10 shows the procedure of the processes and FIG. 11 shows the computer system of the registration server. In FIG. 11, the same reference numerals are assigned to the same components as those used in FIG. 8 in the following description. In this embodiment, the Web server, communication server or load balancer dose not generate the CSR and transmits the server certificate request including the own common name and the password used to generate the encrypted file to the registration server. In the registration server, a first key pair generating means 80 operates to generate the key pair of a public key and a private key used to generate the test certificate, followed by receiving the server certificate request. The generated public key and the common name included in the server certificate request are transmitted to test certificate issuance request generating means 81 to generate the test certificate issuance request including the public key and the common name. The generated test certificate request is transmitted to the test certificate issuing server by means of test certificate issuing request transmitting means 82.

The test certificate issuing server derives the public key and the common name from the received test certificate issuance request to produce data of the public key certificate format including at least the public key and the common name, and to generate the test certificate from the generated data by use of the private key. The generated test certificate is transmitted to the registration server.

The registration server receives the test certificate by means of the test certificate receiving means 57 and transmits it to encrypted file generating means 83. The encrypted file generating means 83 encrypts the received test certificate and the private key generated by the key pair generating means 80 to produce the encrypted Pkcs12 file using the password and then transmits the generated Pkcs12 file to the corresponding Web server through the test certificate transmitting means 58.

The Web server decrypts the received encrypted file using the password and derives the private key and the test certificate. And, the Web server installs the received server certificate using the private key. Subsequently, the Web server transmits the install completion notification to the registration server. In the security environment in which the session of SSL protocol has been established between the registration server and the Web server, the registration server can transmit the test certificate and the private key without the encrypt process being performed.

The install completion notification transmitted from the Web server is received by installation completion notification receiving means 59. Then, SSL protocol accessing means 60 operates to access with SSL protocol to the server identified by the FQDN contained in the server certificate request Further, the test certificate verifying means 61 operates to verify whether or not the session of SSL protocol has been established and also validity of the test certificate installed in the Web server. As the result of the verification, the registration server decides that this server certificate request is valid, if it has been confirmed that the SSL session has been established, the addresses are identical to each other, and the contents of the installed test certificate are identical to those of the transmitted test certificate. As the result of the verification, this server certificate is processed as an error, if the session of the SSL protocol has not been established.

When the server certificate request is decided to be valid, the order acceptance completion notifying means 62 operates to transmit the order acceptance completion notification to the corresponding Web server. Subsequently, second key pair generating means 84 operates to generate a key pair which is used to generate the server certificate. The generated public key is transmitted to the CSR generating means 85 to generate the CSR. The generate CSR is transmitted to the certificate issuing server.

The certificate issuing server provides the received CSR with digital signature using the private key to generate the server certificate, and transmits the generated server certificate to the registration server.

The registration server transforms the received server certificate and the private key into the encrypted Pkcs12 file and transmits it to the corresponding Web server. Thereafter, the operations shown in FIG. 9 are performed.

According to the above-mentioned embodiment, the registration server operates the first key pair generation means 80 at each time of receiving the server certificate request to generate the key pair used to generate the test certificate. However, it is possible that the registration server comprises a fixed and exclusive key pair of the public key and the private key which is only used to generate the test certificate and generates the test certificate by use of the fixed key pair. Namely, the registration server transmits the public key exclusively used to generate the test certificate and the common name contained in the server certificate request to the test certificate issuing server, followed by receiving the server certificate request. The test certificate issuing server produces the data having the public key certificate format from the data including the common name and the public key based on the X.509 standardized specification and generates the test certificate with digital signature. Thus, it is possible to delete the operation of generating the key pair by use of the exclusive key pair which is only used to generate the test certificate.

Figure 12:
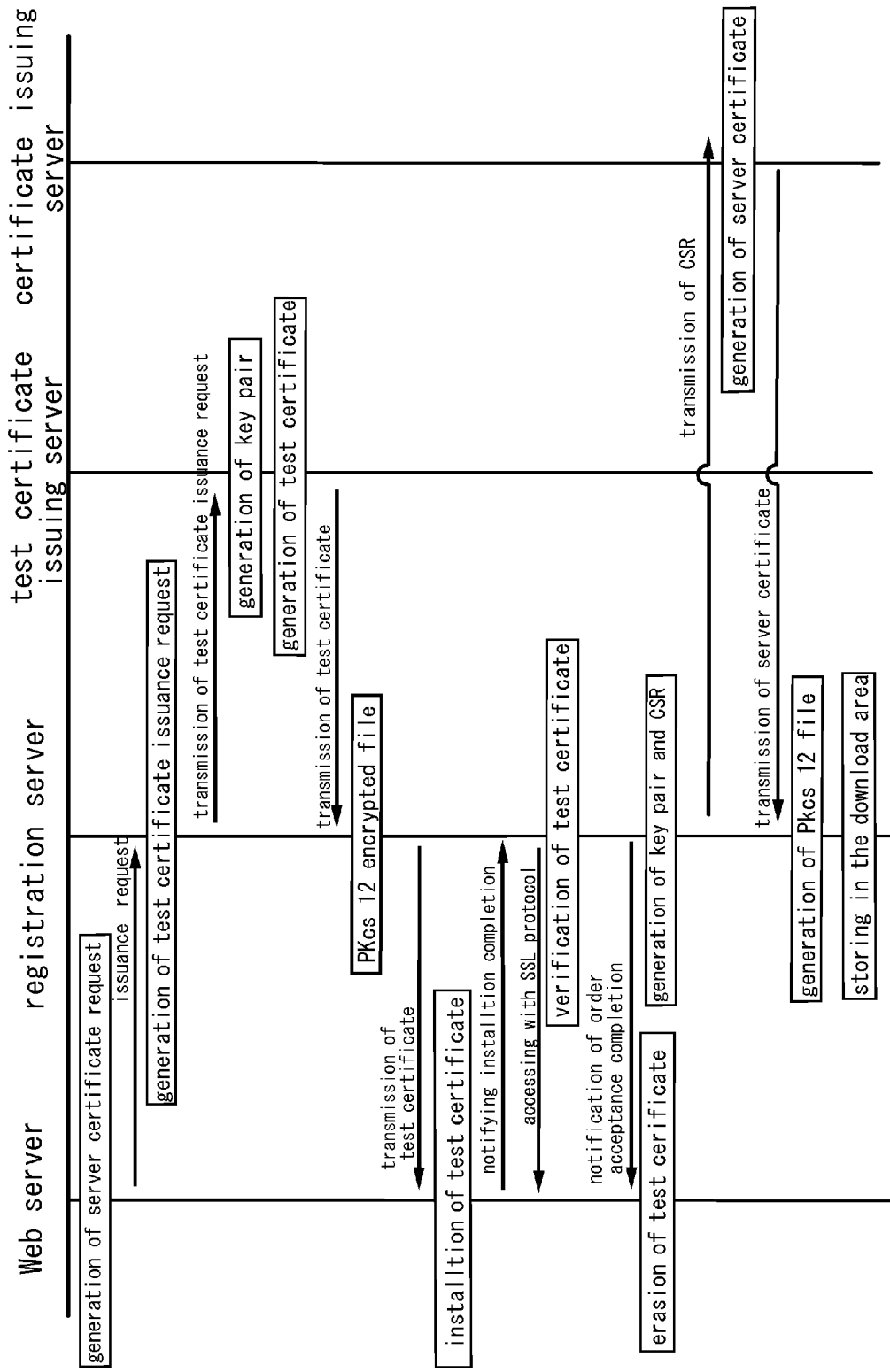
FIG. 12 A diagram showing a forth embodiment of the server certificate issuing system according to the invention.

FIG. 12 shows the forth embodiment of the server certificate issuing system according to the invention. In this embodiment, the generation of the key pair which is used for the generation of the test certificate is performed by the test certificate issuing server. Namely, when the registration server receives the server certificate request, it derives the common name contained in the server certificate request and generates the test certificate issuance request including the derived common name and transmit the generated test certificate issuance request to the test certificate issuing server.

The test certificate issuing server operates the key pair generating means to generate the key pair of the public key and the private key used for the generation of the test certificate. Subsequently, the test certificate issuing server produces the data of the public key certificate format including the common name contained in the test certificate request and the generated public key. Subsequently, the test certificate issuing server provides the generated data with digital signature using the private key to generate the test certificate. The generated test certificate and the private key are transmitted to the registration server.

The registration server transforms the received test certificate and the private key into the encrypted file and transmits the encrypted file to the corresponding Web server. Thereafter, the encrypted file is processed based on the procedures of the third embodiment. In this way, the key pair which is used to generate the test certificate can be generated by the test certificate issuing server. The test certificate issuing server dose not generate the key pair at each time of receiving the test certificate issuance request, but may comprise the fixed and exclusive key pair which is only used to generate the test certificate and may generate the test certificate using the specific key pair.

Figure 13:
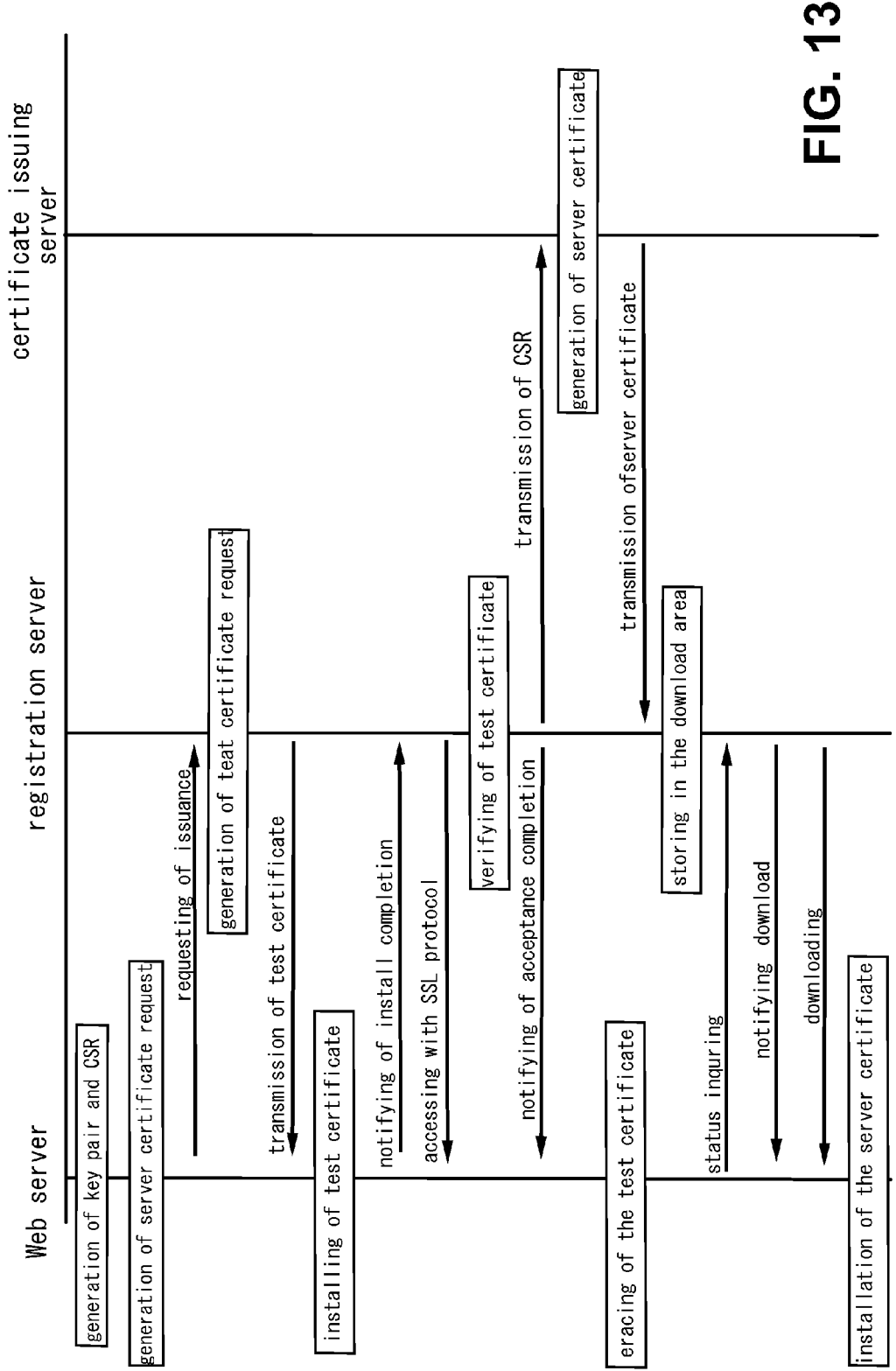
FIG. 13 A diagram showing a fifth embodiment of the server certificate issuing system according to the invention.
Figure 14:
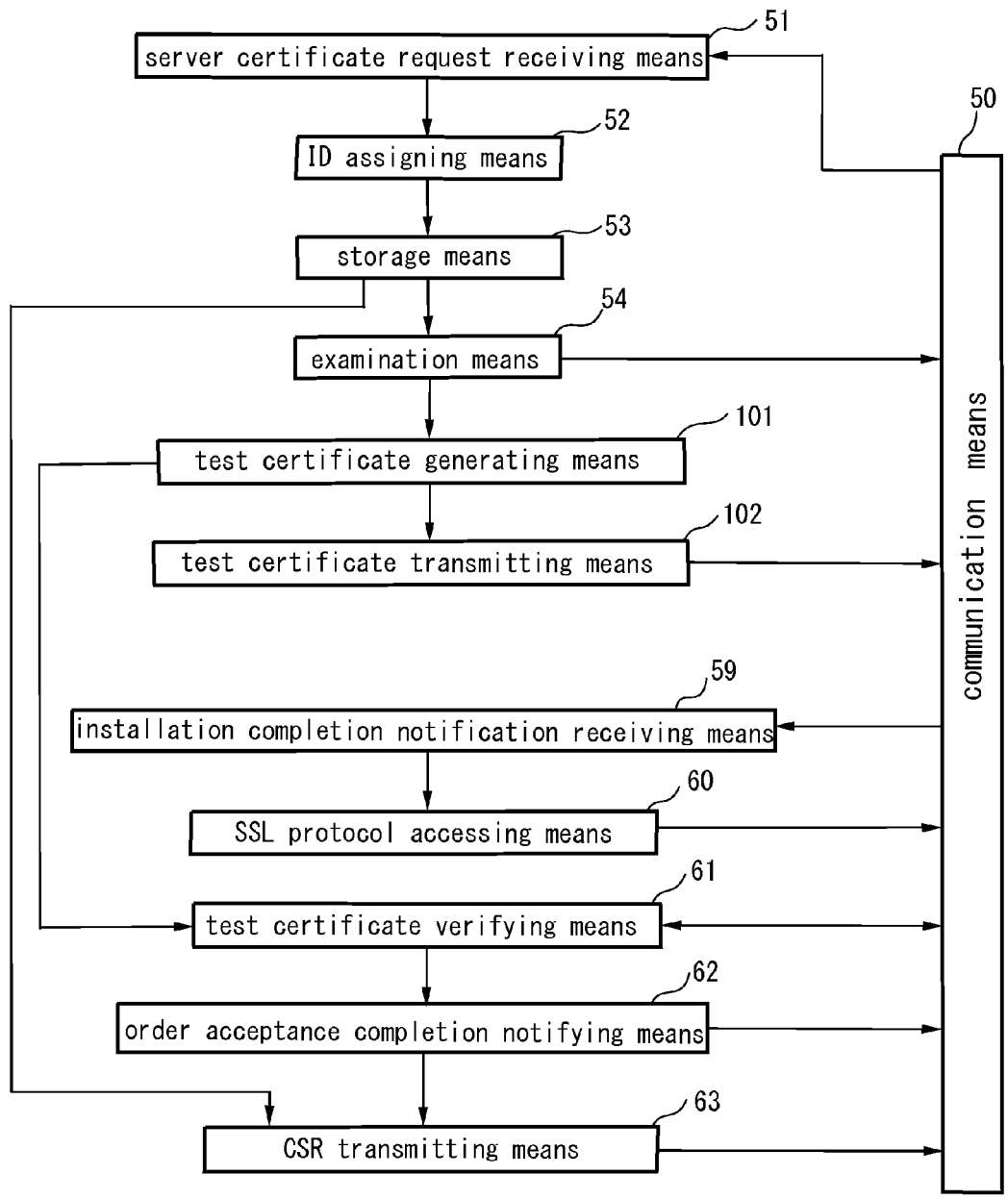
FIG. 14 A diagram showing a computer system of the registration server in the fifth embodiment.

FIGS. 13 and 14 show fifth embodiment of the server certificate issuing system according to the invention. FIG. 13 denotes a procedure of processes in the Web server, the registration server and the certificate issuing server, and FIG. 14 denotes the computer system of the registration server. In this embodiment, the registration server generates the test certificate used for the user authentication. Further this embodiment can be not only applied to the server certificate issuing system in which the test certificate issuance sever is not established but also can be applied to the system in which the test certificate shown in FIG. 1 is established. The registration server is authorized to issue a test certificate having a public key certificate (SSL certificate) format in order to confirm whether the server certificate can be installed in the specific environment. Therefore, in this embodiment, the registration server generates the test certificate to perform user authentication process using the generated test certificate, when the server certificate request is transmitted from the Web server, communication server or the load balancer to the registration server. It should be noted that the same reference numerals are assigned to the same components as those used in FIG. 5 in the following description.

Referring to FIG. 13, the Web server, communication server or load balancer generates the key pair and the CSR. Subsequently, the sever certificate request including the address information of the Web server and the CSR is generated and is transmitted to the registration server via the network.

The registration server generates the test certificate by test certificate generating means 101 after performing a series of the process, followed by receiving the server certificate request. That is, the test certificate generating means 101 derives the CSR from the received server certificate request and provides the CSR with digital signature using the private key of the registration server to generate the test certificate. The generated test certificate is transmitted to the corresponding Web server by the test certificate transmitting means 102.

The Web server installs the test certificate by use of the private key followed by receiving the test certificate. Subsequently, the Web server transmits the install completion notification to the registration server.

The install completion notification transmitted from the Web server is received by the install completion notification receiving means 59. Next, the SSL protocol accessing means 60 operates to access with SSL protocol to the server identified by the FQDN contained in the server certificate request. Further, the test certificate verifying means 61 operates to confirm whether or not the SSL protocol has been established and the validity of the test certificate installed in the Web server. As the result of the verification, the registration server decides that this server certificate request is valid, if it has been confirmed that the SSL session has been established, and the contents of the installed test certificate are identical to those of the transmitted test certificate. As the result of the verification, if the SSL session has not been established, such server certificate request is processed to be an error.

If the server certificate request is decided to be valid, order acceptance completion notifying means 62 operates to transmit the completion of order acceptance to the Web server. And also, the CSR transmitting means 63 operates to transmit the CSR contained in the server certificate request to the certificate issuing server.

The certificate issuing server provides the received CSR with digital signature to generate the server certificate and transmits the generated server certificate to the registration server. Registration server stores the received server certificate in the download area, and such server certificate is downloaded to the corresponding Web server. The Web server installs the downloaded server certificate using the private key.

Figure 15:
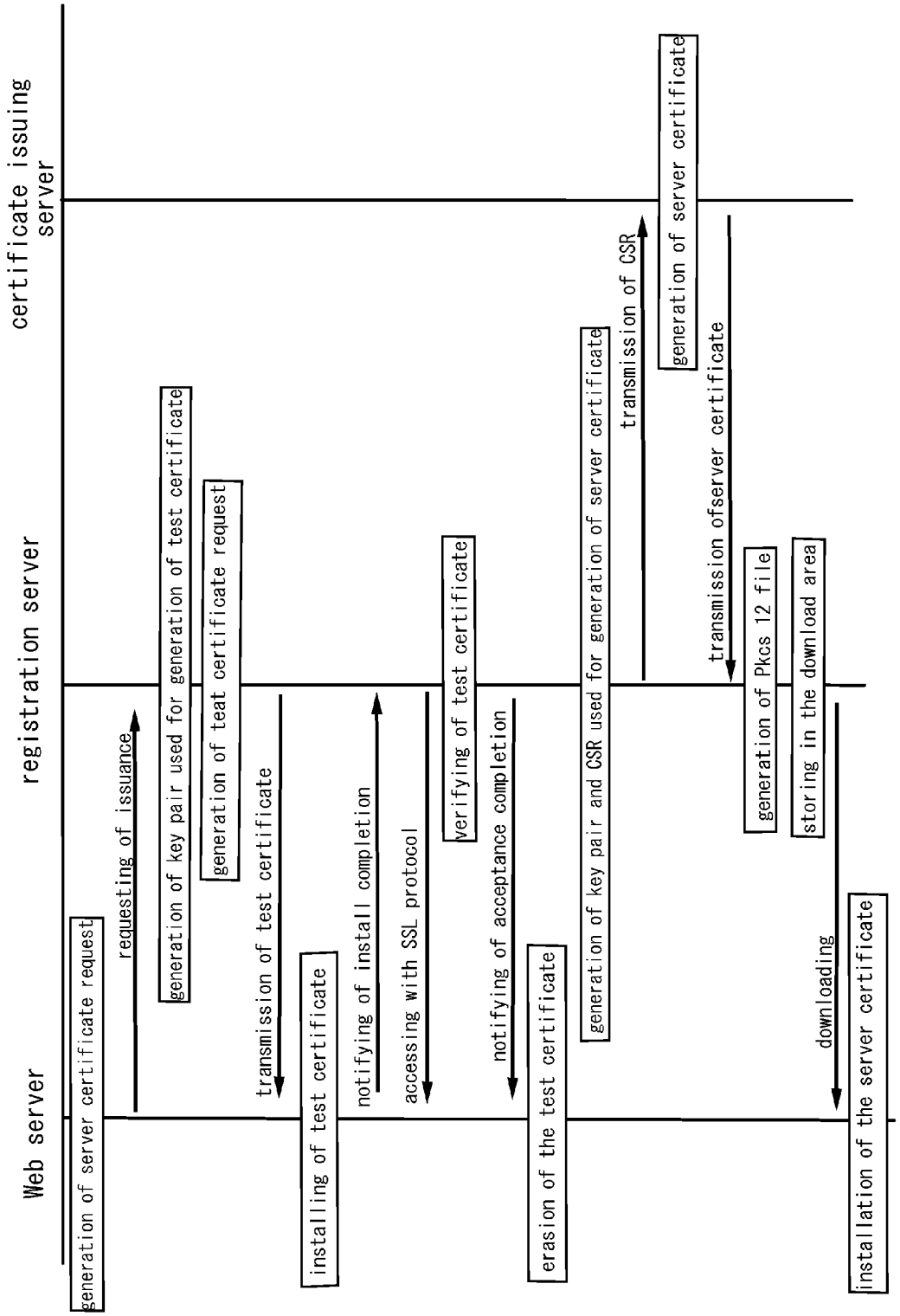
FIG. 15 A diagram showing a sixth embodiment of the server certificate issuing system according to the invention.
Figure 16:
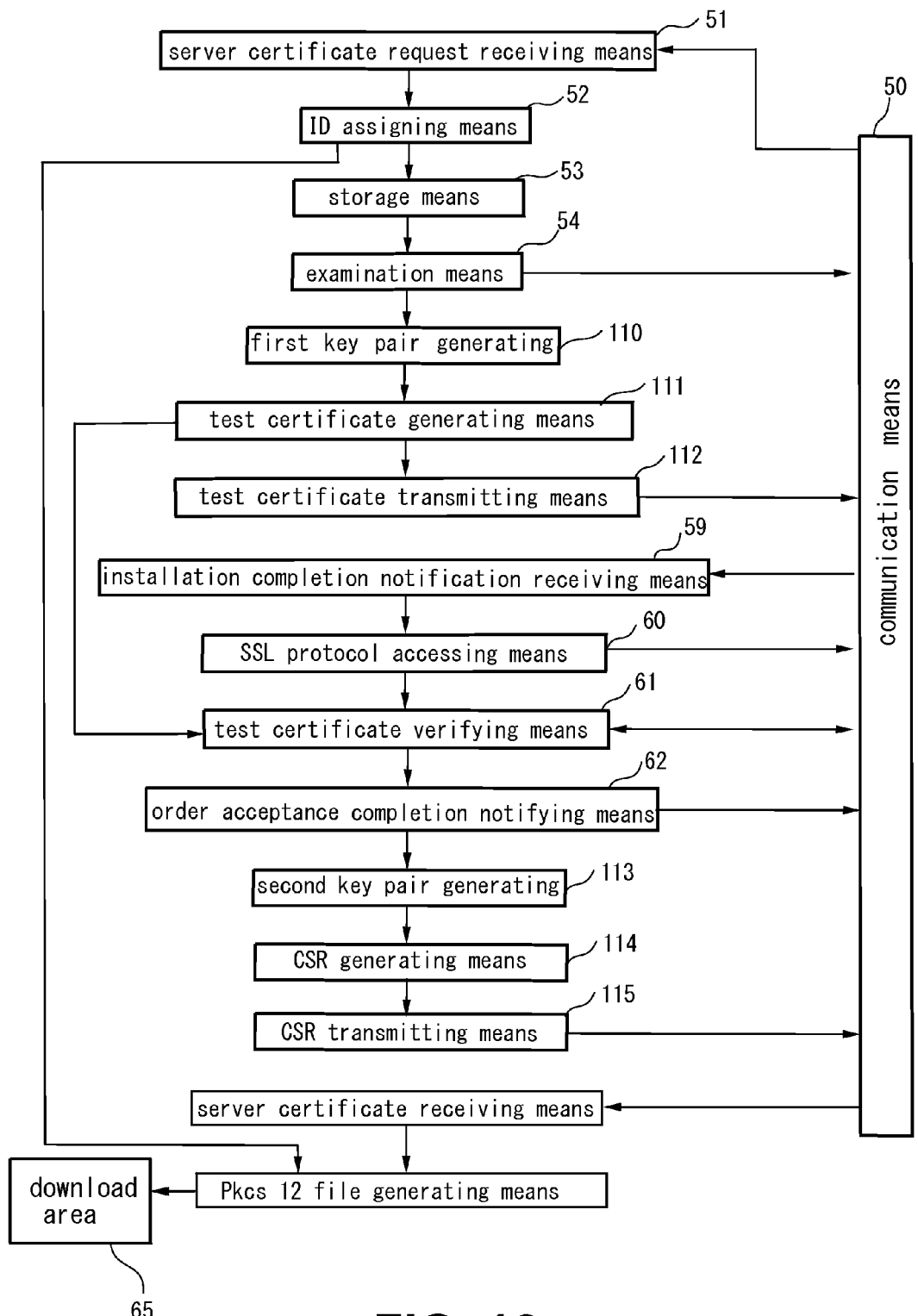
FIG. 16 A diagram showing a computer system of the registration server in the sixth embodiment.

FIGS. 15 and 16 show the sixth embodiment of the server certificate issuing system according to the invention. FIG. 15 denotes the procedure of the processes among the Web server, the registration server and the certificate issuing server, and FIG. 16 denotes the computer system of the registration server. In this embodiment, the key pair used to generate the test certificate is produced by the registration server. The Web server, communication server or load balancer transmits the server certificate request to the registration server. This server certificate request contains the common name of the Web server but do not include the CSR.

When receiving the server certificate request, the registration server operates the first key pair generating means 110 so that the key pair which is only used to generate the test certificate is generated. Then, the test certificate generating means 111 operates to generate the test certificate. The test certificate generating means generates the data having the public key certificate format based on the X.509 standardized specification using the common name contained in the server certificate request and the generated public key in order to generate the data including at least the common name and the public key. Subsequently, the registration server provides the generated data with digital signature using the private key of the registration server to generate the test certificate. The generated test certificate and the corresponding private key are transmitted to the corresponding Web server.

The Web server installs the received test certificate using the private key. And then, the Web server transmits the install completion notification to the registration server.

The registration server accesses the corresponding Web server with SSL protocol to verify the installed teat certificate followed by receiving the install completion notification. As the result of the verification, the registration server decides that this server certificate request is valid, if it has been confirmed that the SSL session is established and the contents of the installed test certificate are identical to those of the transmitted test certificate. Then, the registration server transmits the completion of order acceptance to the Web server.

Subsequently, the second key pair generating means 113 for generating the key pair used to produce the server certificate operates so that the key pair used to produce the CSR is generated. Further, CSR generating means 114 operates to produce the CSR. Subsequently, CSR transmitting means operates to transmit the generated CSR to the certificate issuing server. Thereafter, the procedure of the processes described in the forth embodiment is performed.

The present invention is not limited to the above described embodiments, and various alterations and variations are possible. In the above described embodiments, although the embodiment has been described in which the entry screen generating means, the key pair generating means, the CSR generating means and the verification page generating means are incorporated into the control panel, the present invention is also applied to the case where these means are incorporated into the Web server and not incorporated into the control panel. Furthermore, in the above described embodiments, although the case where one Web server is managed by one person has been described, the present invention is also applicable to a shared Web server in which one Web server is shared by multiple persons.

Furthermore, in the above described embodiments, the operations from the application for the issuance of the server certificate to the installation of the certificate have been performed under the control of the control panel incorporated into the Web server. However, it is also possible to directly construct the above described SSL certificate issuing and managing program in the Web server, or also possible to construct the above described SSL certificate issuing and managing program as an additional function in the Web server in a plug-in manner.

EXPLANATIONS OF THE NUMERALS

1 network
2a~2n user terminal
3a~3m Web server
4 communication server
5 hosting provider
20,50 communication means
21 control panel
22 mail function section
23 Web function section
24 database
25 SSL certificate issuing and managing program
30 entry information generating means
31 key pair generating means
32 CSR generating means
33 server certificate request generating means
34 responding means
35 test certificate install means
36 test certificate erasing means
37 status inquiry means
38 download request means 39 server certificate store means
40 installing means
51 server certificate request receiving means
52 ID assigning means
53 storage means
54 examination means
55 test certificate request generating means
56 test certificate request transmitting means
57 test certificate receiving means
58 test certificate transmitting means
59 installation completion notification receiving means
60 SSL protocol accessing means
61 test certificate verifying means
62 acceptance completion notification transmitting means
63 CSR transmitting means
64 server certificate receiving means
65 download area
66 certificate status inquiry receiving means
67 status response transmitting means
68 certificate download request receiving means
69 server certificate download means

The invention claimed is:

1. A server certificate issuing system comprising a registration server controlled by a registration authority to receive a server certificate request transmitted from a Web server, communication server or load balancer via a network and to transmit a certificate signing request file to a certificate issuing authority, a certificate issuing server controlled by the certificate issuing authority to receive the certificate signing request file transmitted from the registration server via a network, to generate a server certificate with a digital signature, and to transmit the generated server certificate to said registration server, and a test certificate issuing server controlled by a test certificate issuing authority which issues a test certificate used for testing to receive a test certificate issuing request transmitted from the registration server via a network and to issue the test certificate,
wherein
said Web server, communication server or load balancer comprises
means for generating the server certificate request containing the self-address information of the server or the load balancer,
means for transmitting the generated server certificate request to the registration server via the network, and
means for installing the test certificate generated by the test certificate issuing server and transferred from the registration server for authentication, and
said registration server comprises
means for receiving the server certificate request transmitted from said Web server, communication server or load balancer,
means for transmitting the test certificate issuance request to the test certificate issuing server followed by receiving the certificate request,
means for receiving the test certificate generated by the test certificate issuing server and for transferring the received test certificate to the corresponding Web server, communication server or load balancer,
means for accessing with SSL protocol to the Web server, communication server or load balancer identified by the address information contained in the server certificate request and for verifying the test certificate installed in said server or load balancer, and
means for transmitting the certificate signing request file to the certificate issuing server via a network, and
said test certificate issuing server comprises
means for generating the test certificate having public key certificate format followed by receiving the test certificate request from the registration server, and
means for transmitting the generated test certificate to the registration server, and wherein,
said registration server decides that said server certificate request is valid when the session of the SSL protocol has been established and when the certificate information included in the transmitted test certificate is identical to the certificate information included in the installed test certificate, when the registration server accessed to the Web server, communication server or load balancer identified by the address contained in the server certificate request.

2. A server certificate issuing system according to claim 1, wherein, said registration server transmits the certificate signing request file to the certificate issuing server, when the server certificate request has been decided to be valid.

3. A server certificate issuing system according to claim 1, wherein, said test certificate request transmitted from the registration server to the test certificate issuing server contains the certificate signing request file (CSR), and the test certificate issuing server generates the test certificate by signing against the CSR.

4. A server certificate issuing system according to claim 3, wherein, said Web server, communication server or load balancer further comprises means for generating a key pair of a public key and a private key and means for generating the CSR including the generated public key, and wherein the generated CSR is transmitted to the registration server together with the server certificate request, and the registration server transmits the test certificate request including the CSR to the test certificate issuing server.

5. A server certificate issuing system according to claim 4, wherein, said Web server, communication server or load balancer comprises a control panel to mainly configure and control a Web and a mail of the server or the load balancer, and wherein
the means for generating the key pair, the means for generating the CSR, the means for generating the server certificate request and the means for installing the issued server certificate are incorporated into said control panel.

6. A server certificate issuing system according to claim 3, wherein, said registration server further comprises means for generating the key pair of the public key and the private key and means for generating the CSR including the generated public key, and wherein the registration server transmits the server certificate request including the generated CSR to the test certificate issuing server.

7. A server certificate issuing system according to claim 6, wherein, when receiving the test certificate transmitted from the test certificate issuing server, said registration server transmits the received test certificate and the generated private key to the corresponding Web server, communication server or load balancer, and wherein
the Web server, communication server or load balancer installs the received test certificate by use of the received private key.

8. A server certificate issuing system according to claim 7, wherein,
said server certificate request includes a password, and wherein said registration server encrypts the test certificate and the private key by use of said password and transmits the encrypted file to the corresponding Web server, communication server or load balancer, and wherein said Web server, communication server or load balancer decrypts the received encrypted file with said password and installs the test certificate using the received private key.

9. A server certificate issuing system according to claim 1, wherein said registration server comprises a key pair of a public key and a private key which is used to generate the test certificate, and wherein the registration server transmits the test certificate issuance request including said public key used to generate the test certificate and a common name which is included in the server certificate request, and wherein the test certificate issuing server generates the test certificate by use of said public key and the common name contained in the received test certificate request, and wherein the registration server receives the test certificate transmitted from the test certificate issuing server and transmits the received test certificate and the corresponding private key to the corresponding Web server, communication server or load balancer, and wherein the Web server, communication server or load balancer which has received the test certificate installs the received test certificate with the received private key.

10. A server certificate issuing system according to claim 1, wherein said registration server comprises means for generating a key pair of a public key and a private key which is used to generate the test certificate, and wherein the registration server generates the key pair followed by receiving the server certificate request, and transmits the test certificate issuance request including the generated public key and the common name which is included in the server certificate request to the test certificate issuing server, and wherein the test certificate issuing server generates the test certificate by use of the public key and the common name contained in the received test certificate issuance request, and wherein the registration server receives the test certificate transmitted from the test certificate issuing server and transmits the received test certificate and the private key to the corresponding Web server, communication server or load balancer, and wherein said Web server, communication server or load balancer which has received the test certificate installs the received test certificate with the received private key.

11. A server certificate issuing system according to claim 1, wherein said test certificate issuing server comprises means for generating a key pair of a public key and a private key which is used to generate the test certificate, and generates the test certificate using the generated public key and the common name included in the test certificate issuing request, and transmits the generated test certificate and the private key to the registration server, and wherein the registration server transmits the test certificate and the private key to the corresponding Web server, communication server or load balancer followed by receiving the test certificate, and wherein the Web server, communication server or load balancer which has received the test certificate installs the received test certificate with the received private key.

12. A server certificate issuing system according to claim 1, wherein said Web server, communication server or load balancer comprises means for erasing the installed test certificate to erase the installed test certificate, followed by receiving an acceptance completion notification or an error notification.

13. A server certificate issuing system according to claim 1, wherein said Web server, communication server or load balancer comprises status inquiry means for inquiring of the registration server as to the issuance status of the server certificate in order to periodically inquiry using an assigned order ID as a key.

14. A server certificate issuing system according to claim 13, wherein said registration server further comprises means for receiving the server certificate transmitted from the certificate issuing server, means for storing the received server certificate in a download area, means for responding to the status inquiry transmitted from said Web server, communication server or load balancer, and download means for downloading the server certificate stored in the download area to the corresponding Web server, communication server or load balancer, and wherein the registration server confirms whether or not the corresponding server certificate is stored in the download area followed by receiving the status inquiry, and downloads the server certificate stored in the download area to the corresponding server or load balancer, as the response to said status inquiry, if the server certificate is stored, and wherein the processes from the application for issuance of the server certificate to the downloading of the issued server certificate are automatically executed in series.

15. A server certificate issuing system according to claim 1, wherein an administrator of the Web server, communication server or load balancer server accesses to the server managed by him/her via a terminal and the network, calls an entry screen used for inputting the application information of the server certificate, and inputs required application details into the entry screen.

16. A server certificate issuing system according to claim 1, wherein the management of the Web server is entrusted to a hosting provider, and wherein when the hosting provider is entrusted with the application for issuance of the server certificate by the user, the administrator of the hosting provider accesses to the corresponding Web server and inputs the application information of the server certificate.

17. A server certificate issuing system comprising a registration server controlled by a registration authority to receive a server certificate request transmitted from a Web server, communication server or load balancer via a network and to transmit a certificate signing request file to a certificate issuing authority, and a certificate issuing server controlled by the issuing authority to receive the certificate signing request file transmitted from the registration server via network, to generate a server certificate with a digital signature, and to transmit the generated server certificate to said registration server, wherein said Web server, communication server or load balancer comprises means for generating the server certificate request containing the self-address information of the server or the load balancer,
means for transmitting a generated server certificate request to the registration server via network, and
means for installing a test certificate transferred from the registration server for authentication, and wherein said registration server comprises
means for receiving the server certificate request transmitted from said Web server, communication server or load balancer,
means for generating the test certificate having public key certificate format followed by receiving the server certificate request,
means for transmitting the generated test certificate to the corresponding Web server, communication server or load balancer,
means for accessing with SSL protocol to the Web server, communication server or load balancer identified by the address contained in the server certificate request and for verifying the test certificate installed in said server or load balancer, and
means for transmitting a certificate signing request file to the certificate issuing server, and wherein
said registration server decides that said server certificate request is valid when the session of the SSL protocol has been established and when the certificate information included in the transmitted test certificate is identical to those included in the installed test certificate, when the registration server accessed to the Web server, communication server or load balancer identified by the address contained in the server certificate request.

18. A server certificate issuing system according to claim 17, wherein said registration server transmits the certificate signing request file to the certificate issuing server, when the server certificate request is decided to be valid.

19. A server certificate issuing system according to claim 17, wherein
said Web server, communication server or load balancer further comprises means for generating a key pair of a public key and a private key and means for generating a CSR including the generated public key, and wherein
the generated CSR is transmitted to the registration server together with the server certificate request, and wherein
the registration server generates the test certificate by signing against the CSR contained in the server certificate request, and wherein
the Web server, communication server or load balancer which has received the test certificate installs the test certificate by use of the private key.

20. A server certificate issuing system according to claim 17, wherein said registration server further comprises means for generating the key pair of the public key and the private key and means for generating the CSR including the generated public key, and wherein
said registration server generates the key pair and the CSR followed by receiving the sever certificate request, generates the test certificate by signing against the generated CSR, and transmits the generated test certificate and the private key to the corresponding Web server, communication server or load balancer, and wherein
the Web server, communication server or load balancer which has received the test certificate installs the test certificate by use of the received private key.

21. A server certificate issuing system according to claim 17, wherein
said registration server comprises a key pair of a public key and a private key which is used to generate the test certificate, and generates the test certificate by use of the public key used to generate the test certificate and a common name of the Web server, communication server or load balancer included in the server certificate request, and transmits the generated test certificate and the private key to the corresponding Web server, communication server or load balancer, and wherein
the Web server, communication server or load balancer which has received the test certificate installs the test certificate by use of the received private key.

22. A server certificate issuing system according to claim 17, wherein
said registration server comprises means for generating a key pair of a private key and a public key which is used to generate the test certificate, and generates the test certificate using the generated public key and the common name of the Web server, communication server or load balancer included in the server certificate request, and transmits the generated test certificate and the private key to the corresponding Web server, communication server or load balancer, and wherein
the Web server, communication server or load balancer which has received the test certificate installs the received test certificate by use of the received private key.

23. A server certificate issuing system according to claim 20, wherein
said server certificate request includes a password, and wherein
said registration server encrypts the test certificate and the generated private key using
said password and transmits the encrypted file to the corresponding Web server, communication server or load balancer, and wherein
said Web server, communication server or load balancer decrypts the received encrypted file with said password and installs the test certificate using the received private key.

24. An authentication method worked in a server certificate issuing system, which system comprises a registration server controlled by a registration authority to receive a server certificate request transmitted from a Web server, communication server or load balancer via a network and to transmit a certificate signing request file to a certificate issuing authority, a certificate issuing server controlled by the issuing authority to receive the certificate signing request file transmitted from the registration server, to generate a server certificate with a digital signature and to transmit the generated server certificate to the registration server, and a test certificate issuing server controlled by a test certificate issuing authority which issues a test certificate used for testing to receive a test certificate issuing request and to issue the test certificate, said authentication method comprising the steps of:
a step in which the registration server generates the test certificate request and transmits the generated test certificate to the test certificate issuing server, followed by receiving the server certificate request transmitted from the Web server, communication server or the load balancer via a network;
a step in which the test certificate issuing server generates the test certificate having a public key certificate format and transmits the generated test certificate to said registration server, followed by receiving the test certificate request;

a step in which the registration server transmits the received test certificate to the corresponding Web server, communication server or load balancer;

a step in which the Web server, communication server or load balancer which has received the test certificate installs the received test certificate;

a step in which the registration server accesses with SSL protocol to a Web server, communication server or load balancer identified by an address contained in the received server certificate request and verifies whether or not a session of SSL protocol is established, and wherein said registration server decides that said server certificate request is valid when the session of the SSL protocol has been established and when the certificate information included in the transmitted test certificate is identical to those included in the installed test certificate, when accessing the Web server, communication server or load balancer identified by the address contained in the server certificate request.

25. An authentication method according to claim 24, wherein said test certificate request transmitted from the registration server to the test certificate issuing server includes a certificate signing request file (CSR) generated by the Web server, communication server or load balancer, and wherein said test certificate issuing server signs against the CSR contained in the received test certificate request to generate the test certificate.

26. An authentication method according to claim 24, wherein said test certificate request contains a common name of the Web server, communication server or load balancer and a public key generated by the registration server, and wherein said test certificate issuing server signs against the data including the common name and the public key contained in the received test certificate request to generate the test certificate.

27. An authentication method according to claim 24, wherein said test certificate issuing server generate a key pair of a public key and a private key followed by receiving the test certificate request, and wherein the test certificate issuing server signs against the data including the generated public key and the common name contained in the test certificate request to generate the test certificate.

28. An authentication method worked in a server certificate issuing system, which system comprises a registration server controlled by a registration authority to receive a server certificate request transmitted from a Web server, communication server or load balancer via a network and to transmit a certificate signing request file to a certificate issuing authority, a certificate issuing server controlled by the issuing authority to receive the certificate signing request file transmitted from the registration server, to generate a server certificate with a digital signature and to transmit the generated server certificate to the registration server, said authentication method comprising the steps of;

a step in which the registration server generates a test certificate having a public key certificate format and transmits the generated test certificate to the corresponding Web server, communication server or the load balancer, followed by receiving the server certificate request transmitted from the Web server, communication server or the load balancer;

a step in which the Web server, communication server or the load balancer which has received the test certificate installs the received test certificate;

a step in which the registration server accesses with SSL protocol to the Web server, communication server or load balancer identified by an address contained in the received server certificate request and verifies whether or not a session of SSL protocol is established, wherein said registration server decides that said server certificate request is valid when the session of the SSL protocol has been established and when the certificate information included in the transmitted test certificate is identical to those included in the installed test certificate, when accessing to the Web server, communication server or load balancer identified by the address contained in the server certificate request.

29. An authentication method according to claim 28, wherein said server certificate request includes the certificate signing request file (CSR) generated by the Web server, communication server or load balancer, and wherein said registration server signs against the CSR contained in the received server certificate request to generate the test certificate.

30. An authentication method according to claim 28, wherein said registration server generates a key pair of a public key and a private key used to produce the test certificate followed by receiving the server certificate request, and signs against the data including a common name contained in the server certificate request and the generated public key to generate the test certificate.

31. An authentication method according to claim 28, wherein said registration server comprises a key pair of a public key and a private key used to generate the test certificate, and signs against the data including a common name contained in the server certificate request and said public key to generate the test certificate.

* * * * *